United States Patent [19]

Van Hook et al.

[11] 4,026,823

[45] May 31, 1977

[54] HYDROCARBON REFORMING CATALYST AND METHOD FOR PREPARING SAME

[75] Inventors: James P. Van Hook, Basking Ridge; Joseph C. Yarze, Union, both of N.J.

[73] Assignee: Pullman Incorporated, Chicago, Ill.

[22] Filed: Mar. 31, 1975

[21] Appl. No.: 564,008

Related U.S. Application Data

[62] Division of Ser. No. 120,971, May 4, 1971, abandoned.

[52] U.S. Cl. .............................. 252/472; 252/373; 48/213; 48/214 A
[51] Int. Cl.² .................. B01J 21/06; B01J 23/74
[58] Field of Search ................................. 252/472

[56] References Cited

UNITED STATES PATENTS

| | | | |
|---|---|---|---|
| 3,119,667 | 1/1964 | McMahon | 252/373 X |
| 3,385,670 | 5/1968 | Van Hook et al. | 252/472 X |

FOREIGN PATENTS OR APPLICATIONS 1,095,996  12/1967  United Kingdom ............... 252/373

Primary Examiner—W. J. Shine
Attorney, Agent, or Firm—Kurt S. Myers; C. W. Crady, Jr.

[57] ABSTRACT

A catalyst composition consisting of elemental nickel, nickel oxide or mixtures thereof on a zirconia carrier and promoted with elemental cobalt, a cobalt oxide or mixtures thereof in which the total content of nickel and cobalt, expressed as oxide, is desirably at least 1 weight percent of the total weight of the composition and the weight ratio of nickel to cobalt in the catalyst is preferably between 1:10 and 6:1. This invention also concerns the method of reforming hydrocarbons in the presence of said catalyst to selectively produce hydrogen, hydrogen containing products, such as Town's gas, or an oxide of carbon or mixtures thereof, while avoiding substantial carbon accumulation on the catalyst at relatively low steam to carbon ratios.

24 Claims, 3 Drawing Figures

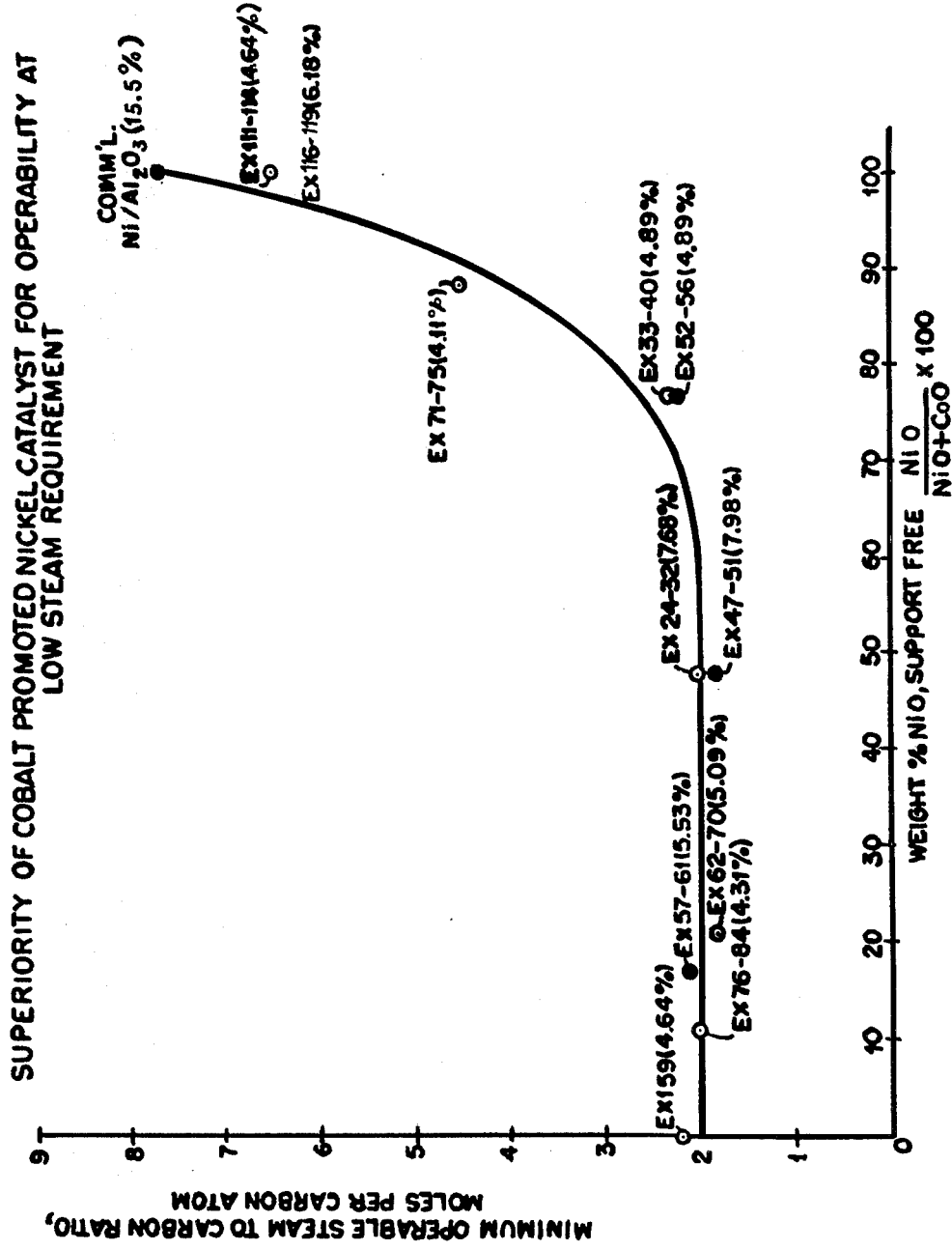

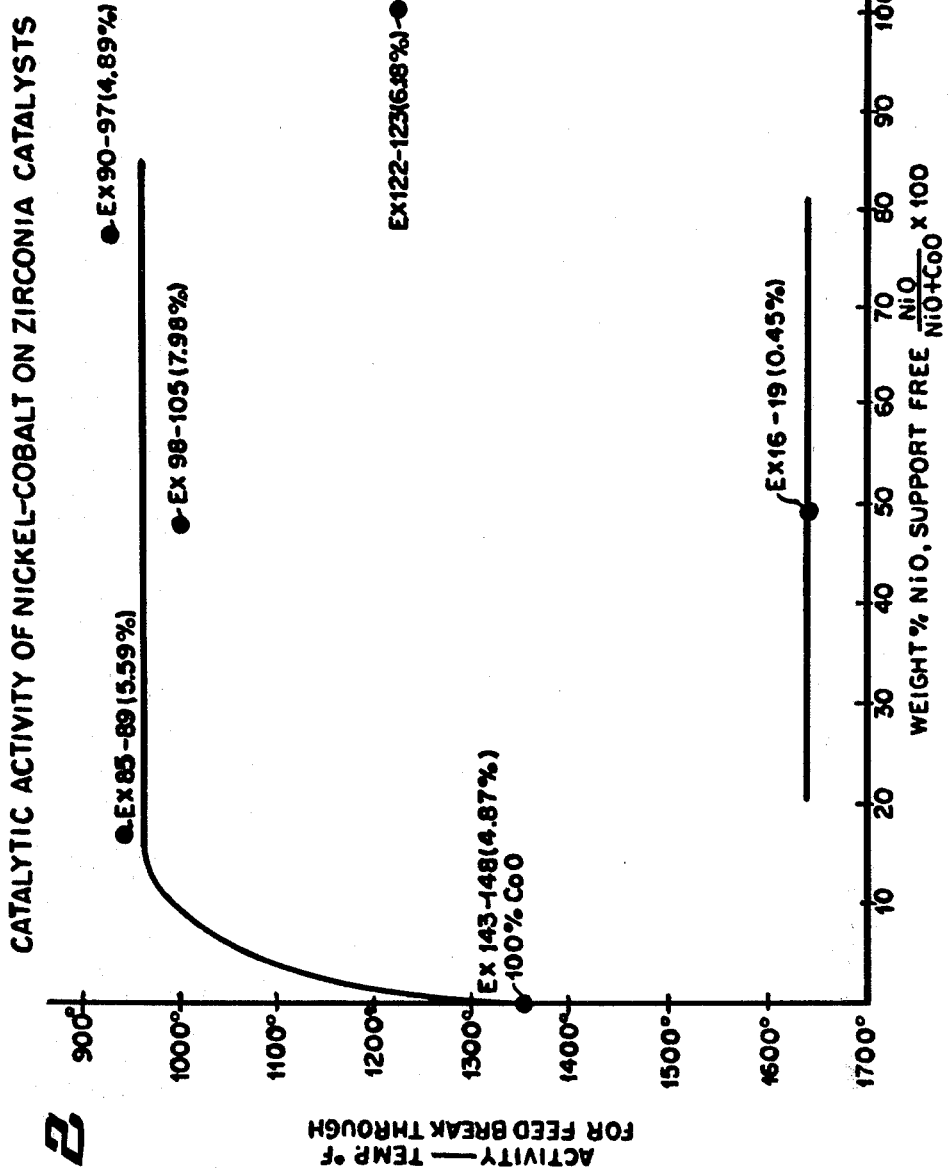

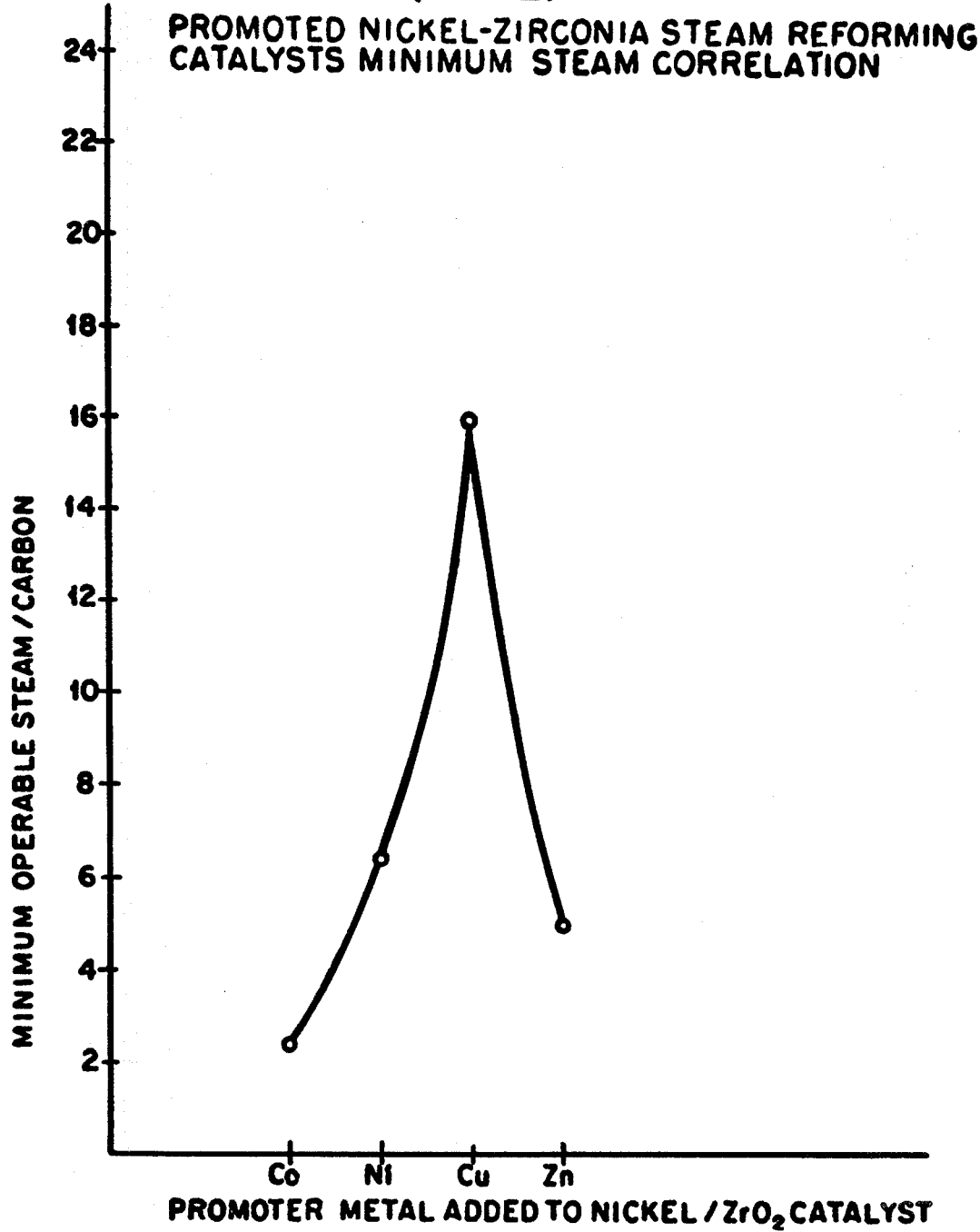

HYDROCARBON REFORMING CATALYST AND METHOD FOR PREPARING SAME

This is a division of application Ser. No. 120,971 filed May 4, 1971, now abandoned.

This invention relates to the production of hydrogen and/or an oxide of carbon by the conversion of hydrocarbons in the presence of a particular contact material. In a more specific aspect, this invention relates to an improved catalyst composition for use in steam or carbon dioxide reforming of hydrocarbons, including olefinic and relatively high molecular weight paraffinic hydrocarbons to produce hydrogen, hydrogen containing materials or an oxide of carbon or a mixture of one or more of these components.

Reforming of hydrocarbons generally comprises contacting hydrocarbon and steam or carbon dioxide, or mixtures thereof, in the presence of a catalyst at a temperature of between about 1000° F. and 1800° F. to produce a gaseous product mixture. In processes involving reforming of olefinic or liquid paraffinic feedstocks, temperatures greater than 1400° F. are usually required to achieve hydrocarbon conversions higher than 90 percent. Notwithstanding the high conversions obtained, such high temperatures have a deleterious effect on the operation of the process. For example, the catalyst life is seriously shortened and harmful levels of carbon accumulation on the catalyst are frequently encountered under severe conditions, even with the most durable of catalysts, such as the nickel catalysts which decomposes carbon monoxide to carbon and carbon dioxide at high temperatures.

Catalysts commonly employed for commercial reforming operations include iron, manganese, and nickel catalysts wherein the catalytic moiety is supported on, or diluted with, an acidic refractory support comprising silica, alumina, or mixtures containing alumina such as aluminous cement containing magnesia and calcium oxide as binding agents. While such binary catalysts may be successfully employed for steam reforming of normally gaseous paraffins under relatively low temperatures and steam-to-carbon ratios, they are usually unsuitable under the same operating conditions for conversion of feedstocks containing significant amounts of unsaturated compounds, such as olefins and/or higher molecular weight paraffinic compounds due to considerable carbon accumulation on the catalyst which leads to plugging and loss of catalyst activity.

The steam reforming reaction is illustrated by the following equation which shows the reaction between the normally liquid hydrocarbon, normal-heptane, and steam to produce hydrogen containing gaseous product:

$$C_7H_{16} + 7H_2O \rightarrow 15H_2 + 7CO \quad (1)$$

The steam reforming of such hydrocarbons as well as olefins is complicated by a side reaction involving the breakdown of the hydrocarbons into elemental or free carbon, as illustrated by the following equation:

$$C_7H_{16} \rightarrow 7C + 8H_2 \quad (2)$$

The formation of carbon, which is a solid, during the main steam reforming reaction is undesirable for a number of reasons. The free carbon, being a solid, deposits and gradually builds up on the catalyst. During the initial build-up of carbon, the effectiveness of the catalyst is lowered, the accumulation of carbon blocking contact between catalyst and reactants. Eventually, excessive carbon accumulation blocks the space between the particles of the catalyst which in turn prevents the hydrocarbon feed and steam from passing through the catalyst bed. If carbon accumulation on catalyst is severe physical deterioration or powdering of the catalyst results. The blocking of the catalyst bed with carbon forces a shutdown of the steam reforming plant. During shutdown, the catalyst bed must necessarily be regenerated by treatment with an oxygen-containing gas or steam to remove the solid carbon by combustion.

The build up of carbon is especially severe when the hydrocarbon feed to be converted contains substantial amounts of unsaturated compounds (that is, olefins such as ethylene and propylene) or is a normally liquid feed such as naphtha which is a mixture of $C_5$ to $C_{10}$ hydrocarbons having an average molecular weight of normal-heptane. Because of the severity of the carbon problem, the aforementioned catalysts conventionally employed to reform methane, are unsatisfactory for the steam reforming of other hydrocarbons, particularly normally liquid hydrocarbons and olefinic feeds.

Fairly recent developments have demanded the utilization of feedstocks other than natural gas or methane as a source of hydrogen. However, in order to provide a commercially feasible process, avoidance of free carbon build up is required to ensure long periods of continuous operation of the steam reforming reaction and to prevent severe deterioration of the catalyst otherwise caused by the frequent necessity to regenerate the catalyst to burn off the excessive carbon deposit.

A number of solutions to the problems associated with carbon plugging of catalysts in steam reforming of hydrocarbons and particularly feeds heavier than methane, have been proposed. These solutions depend on high steam-to-carbon ratios in the reactor, alkali promoted catalysts and on particular process features, as opposed to the use of a particular catalyst different from those conventionally employed. One approach is to operate a cyclic process whereby carbon laid down during reaction would be burned off during the catalyst regeneration cycle. However, this method does not avoid deleterious carbon accumulation, and is associated with all the inherent inefficiencies of cyclic processing.

Another approach is to operate at high ratios of steam-to-carbon; however, the high steam requirement results in higher fuel and steam coats, a larger reforming furnace, and a gradual deactivation of the nickel catalyst.

A third approach is to employ a different type of reaction, referred to as partial or controlled oxidation of the hydrocarbon by which oxygen is reacted with the hydrocarbon in the absence or presence of steam. This method has the disadvantage of requiring either an additional investment in an oxygen facility as an adjunct to the hydrogen-producing plant, or the purchase of oxygen from an outside source. Either means of supplying oxygen for the controlled oxidation process obviously adds a substantial cost to the process and is, therefore, unattractive.

It is an object of this invention, therefore, to provide a new and improved contact material which overcomes the above difficulties and disadvantages and which is particularly useful for the reforming of hydrocarbons.

Another object of this invention is to provide a particular contact material which is useful in the reforming of normally liquid paraffinic or olefinic feedstocks at relatively low steam-to-carbon ratios without deleterious carbon accumulation on the catalyst.

Another object is to provide an improved reforming process wherein the novel contact material is employed.

Another object is to provide a contact material having high activity and low steam-to-carbon requirement.

Still another object is to provide a reforming catalyst having improved properties which permits conversion of hydrocarbons at substantially lower temperature in the absence of deleterious carbon accumulation.

Yet another object is to provide a process for the reforming of hydrocarbons without the necessity of utilizing oxygen as a reactant.

These and other objects and advantages of the present invention will become apparent to those skilled in the art from the accompanying description and disclosure.

In accordance with the present invention, there is provided a new and improved contact material which is composed of a nickel component, such as elemental nickel, nickel oxide or mixtures thereof, deposited on zirconia and promoted with a cobalt component, such as elemental cobalt, cobalt oxide or mixtures thereof. By employing this ternary contact composition, reforming of otherwise difficulty reformed feedstocks is made technically and economically feasible while avoiding the need for oxygen or excessively high ratios of steam-to-carbon.

The ternary contact materials of the present invention are particularly useful in the reforming of olefinic and $C_6$ and higher molecular weight hydrocarbons and permit operation at temperatures which are substantially lower than those heretofore employed by reason of their increased activity. The present catalyst compositions also provide high conversion to gaseous product. For the purpose of this disclosure, "high conversion" is intended to mean a conversion of at least 95 weight percent. Although conversions of about 90 weight percent have been obtained in prior processes with various metal catalysts, the difficulty with these catalysts is that unless excessive amounts of steam are introduced into the reaction zone during reaction, the high conversion to product is accompanied with high carbon accumulation. Thus, the catalysts of prior reforming processes have had a relatively short catalyst life when employed in the absence of expensive measures for prevention of carbon oxide by-product decomposition.

The ratio of steam to hydrocarbon employed in reforming processes is usually expressed as "the steam-to-carbon ratio" which is defined as the number of moles of steam charged to the reforming zone per atom of carbon in the hydrocarbon feed. For example, a feed composition of 6 moles of steam per mole of propane corresponds to a steam-to-carbon ratio of 2. Commercial reforming processes have found it necessary to operate at uneconomical levels of the steam-to-carbon ratio, i.e., about 10 or more, in order to minimize carbon accumulation.

The characteristics of the novel contact materials of this invention is that they display a high activity and long catalyst life over a wide range of steam-to-carbon ratios, including relatively low ratios which heretofore have been regarded as unsuitable for commercial use.

The present catalyst compositions minimize deleterious carbon accumulation while obtaining high conversions of olefinic and liquid paraffinic feedstocks, as well as gaseous paraffinic feedstocks.

The ternary catalyst compositions of this invention are unique in that the zirconia support material is substantially inert with respect to the catalytically active components. For this reason, spinel formation involving the support material of prior catalysts is substantially avoided in the present compositions. This non-reactivity between the active species and the support provides an important advantage in that the maximum of catalyzing efficiency of the active components is directed toward promoting the reaction and is not dissipated in side reactions, such as the gradual formation of spinels or other complexes involving the support. Thus, the present catalysts possess an extended catalyst life at maximum efficiency.

Another advantage of the present catalysts, in which cobalt is employed as the promoter, is that the cobalt component is not volatile under conditions of operation so that these catalysts show a permanent improvement in catalyst properties which may be extended through subsequent regeneration. The promoting effect of cobalt is unexpected since it is neither an alkali nor an akaline earth metal, nor is this transition metal known to have any effect on the nickel or zirconia components. It has now been found that, in addition to the ability of cobalt to promote the nickel-zirconia catalyst, the combination of cobalt and nickel results in a synergistic effect wherein each active metal of the combination contributes a total effect which is greater than that which can be obtained individually. More specifically, it is found that when the contact material of the present invention contains a proportion of nickel within the higher range of concentration, for example from 25 to 30 weight percent of the total composition, an unusually low steam-to-carbon requirement characterizes the catalyst. This effect is particularly surprising since it is known that unpromoted nickel catalysts have required at least a five fold excess of steam in order to avoid deleterious carbon accumulation when under operation for a substantial period of time, e.g., more than one month. It should be understood that the catalyst life in commercial operation is necessarily longer than 3 months and is desirably longer than 1 year so as to avoid frequent interruption of the process. The ternary catalyst compositions of the present process are generally effective for periods up to a year or more and the steam requirement during operation may be as low as 1. In this regard it has been discovered that when only 0.5 weight percent cobalt is added to the nickel-zirconia catalyst, such lowering of the steam-to-carbon ratio results that levels approaching unpromoted cobalt on zirconia are obtained. The term "minimum steam-to-carbon ratio" as used herein is that ratio below which carbon accumulation on the catalyst is sufficient to cause an observable rise in the pressure drop across the catalyst bed. When using the catalysts of this invention, a minimum steam-to-carbon ratio as low as from about 1 to about 3 can be employed without degradation of the catalyst.

Also indicative of the synergistic effect of the cobalt and nickel combination, is the discovery that with as little as 0.5 weight percent nickel in the total catalyst composition, the high activity which characterizes commercial nickel catalysts is retained and is coupled with a low minimum steam-to-carbon ratio. In summary, it is observed that the improvement in these properties is disproportionately higher than that which could be attributed to the improvement expected from a given amount of cobalt or nickel component present in the catalyst.

The present catalysts contain the components combined, for the most part, in a uniformly distributed solid solution; as distinct from the separate oxide phases of previous catalysts wherein each phase must be maintained intact so as to prevent physical and chemical degradation. In addition, the combination of these particular components contribute to the high thermal resistance of the present catalysts which are capable of withstanding temperatures of up to 2500° F. without serious chemical or physical degradation. For this reason the present catalysts are particularly well suited for reforming olefinic and heavier paraffinic hydrocarbons which usually require more severe reforming conditions.

The catalytically active moieties of the present contact materials are the nickel and cobalt components. The total concentration of these active components in the contact material is at least about one weight percent, expressed as the oxides of the cobalt and nickel metals and the weight ratio of nickel to cobalt is between about 1:15 and about 9:1, preferably between 1:10 and 6:1. Generally, an excess of the zirconia support with respect to active components is employed and more often a total active components concentration of between about 1.5 and about 25 weight percent, expressed as oxides, is employed. Although a higher concentration of active components can be used, from the standpoint of economy, such higher concentrations offer no significant improvement in hydrocarbon conversion or minimum steam-to-carbon ratio and are, therefore, usually not employed. The concentration of cobalt promoter, expressed as oxide, in the total composition can be as low as about 0.2 weight percent and as high as about 25 weight percent or higher, preferably within the range of between about 1 and about 15 weight percent, as oxide. The concentration of nickel can be as low as 0.1 weight percent and as high as 25 weight percent or higher, expressed as oxide, in the total composition, preferably between about 0.5 and about 15 weight percent, as oxide. Of course it is to be understood that within the above ranges of nickel and cobalt concentration, the total active metal concentration in the ternary composition usually does not exceed 50 weight percent, preferably 30 weight percent, expressed as oxides. A composition of from about 1 to about 5 weight percent nickel; from about 2 to about 8 weight percent cobalt, expressed as oxides, and from about 85 to about 97 weight percent zirconia has been found to be exceptionally desirable.

The support material of the present ternary catalyst compositions is extremely important. Aside from having the necessary refractory properties for reforming processes, the zirconia support is inert with respect to the nickel and cobalt components of the catalyst composition. Thus, reaction between the active metals and the support is substantially avoided. Unlike the acidic alumina, silica, aluminium silicate and titania support materials of prior reforming catalysts which react with nickel or cobalt compounds or both, zirconia is non-acidic and can be subjected to repeated regeneration without loss of porosity or alteration of structure. These properties of zirconia contribute to the superior activity and low steam requirement of the present catalytic compositions in hydrocarbon reforming.

The zirconia support usually contains from 90 to 100 percent by weight of zirconium dioxide. Other oxides which may be present in the zirconia support as impurities include the oxides of titanium, silicon, calcium, magnesium and iron. These oxides are usually present in small amount so that they do not alter the chemical or physical properties of the zirconia. Each of the above metal oxides may be present as the sole impurity or combinations of these metal oxides may appear as the impurity in the zirconia material when impurities are present. In commercial refractory zirconia a few percent of calcium oxide (4–5%) is added in order to stabilize the zirconia crystal structure. Substantially pure zirconia is prepared synthetically by precipitation of the hydrous oxide by treatment of zirconium salts such as zirconium nitrate, carbonate or sulfate, with aqueous alkaline solutions such as ammonium hydroxide or potassium hydroxide. The precipitated hydrous oxide is dried, washed and, if desired, calcined at an elevated temperature such as between about 800° F. and about 1400° F.

As stated above, the cobalt component and the nickel component are incorporated into the support material either as the oxid, an oxide mixture, the elemental metal or as mixtures of oxide and elemental metal. When it is desirable to incorporate both components as oxides, they may be added to the zirconia support as individual oxides or as a combined oxide, such as a nickel cobaltide. Suitable nickel cobaltides include nickel tetritacobaltide, nickel hemicobaltide, nickel tetracobaltide, nickel cobaltide and mixtures thereof. Suitable individual oxides include the oxide compounds of nickel and cobalt and oxide hydrates of these compounds. When it is desirable to incorporate one or both of the components in the support as the elemental metal or metal oxide, any salt of nickel and cobalt which is decomposable to the corresponding elemental metal or metal oxide upon heating and which does not react to any appreciable extent with the remaining components of the catalyst, can be used as a precursor.

The active metal component can be added to the support in any convenient manner which include the methods of impregnation, co-precipitation, dry or wet milling, extrusion and ion exchange or a combination of two or more of these techniques. For example, the combination of impregnation and milling is useful in obtaining high concentrations of active metals on the support; although other convenient combinations will become apparent to those skilled in the art from the following disclosure.

In the preparation of catalysts comprising elemental metals on the support, a convenient procedure comprises treating the support with a compound or compounds of the metal, such as the hydroxide, nitrate, phosphate, sulfate, carbonate or sulfite or combinations thereof, drying, heat treating to decompose the metal salts and then reducing the decomposed compound to the elemental metal with hydrogen, carbon monoxide, ammonia or any other convenient reducing agent or mixture of reducing agents. A suitable method for preparing a catalyst containing the active metal oxides on the support is similar to that described for the elemental metal except that the reduction step is omitted.

Of course it is to be understood that the catalyst may contain a mixture of elemental metal and metal oxide, if desired, and that either or both of the active metal components can be added to the support in the form of the elemental metal, the metal oxide or a metal salt such as a carbonate which is decomposable to the metal oxide or elemental metal during reforming.

High concentrations of active metals on the support can be achieved by forming a dry or wet mixture of the three components of the catalyst and extruding the mixture in the form of rings, saddles, pellets or in any form required. In this case the initial mixture usually contains the desired final concentration of the metals; although further treatment of the extruded forms may be effected, e.g., by impregnation, for higher concentration of one or both components or for surface deposition of the nickel or cobalt component. Final deposition of one of the active metals on the extruded mass allows for lower concentration of that metal in the extrusion mixture.

The preparation of the catalysts of this invention by impregnation involves the zirconia support, either in the form of the hydrous zirconia or dried or calcined zirconia with an aqueous solution or suspension of a nickel and a cobalt compound selected from the above-mentioned group of compounds. The treatment usually comprises dipping, spraying or soaking the formed zirconia support with the solution or suspension containing active metal component. The treatment can be effected with both active metal compounds in suspension or solution simultaneously or with separate solutions or suspensions, each containing an active metal compound. The separate solutions or suspensions can be applied alternately or several applications of one solution or suspension can be effected before one or more application of the other until the desired configurations of the active compounds is achieved. It is not necessary that the same salt of the active metal compound be used as the precursor in the solutions or suspensions which are applied to the support; thus, an aqueous solution of either nickel or cobalt nitrate may be employed with a solution of the remaining active metal carbonate, for example. Alternatively, the active metals in the form of elemental metal, metal oxide or nickel cobaltide may be prepared as a solution or suspension and the support treated with the resulting liquid mixture or mixtures or with any of the salt precursor mixture above.

After the zirconia support is treated with the aqueous mixture or mixtures; the mass is dried. Instead of drying after the final impregnation or when the final concentrations of active metals has been obtained, the drying operation may be effected after each treatment of the support with the impregnating liquid or after several treatments with the same or different impregnating liquids. The dried composite is calcined to convert any salts to the corresponding oxide, elemental metal or mixtures thereof or to expel the volatiles from the catalyst composition and can be effected after the final drying step. Drying followed by calcining can be effected after each or after multiple impregnations of the support material. Such heat treatment is usefully employed when 15 weight percent or more active metals are desired on the support.

Drying is carried out at a temperature below 600° F. and is usually accomplished at a temperature of between about 175° F. and about 550° F., for a period of from 1 to 30 hours; although longer or shorter drying periods may be used as required. Calcination is effected by heating the dried composite at a temperature of from about 600° F. to about 3000° F. and more usually at a temperature of from about 800° F. to about 1200° F., in the presence of oxygen, air or nitrogen or mixtures thereof, to convert any salts to oxides; or in the presence of a hydrogen-containing reducing gas, e.g., hydrogen, ammonia or carbon monoxide to convert at least a portion of salts to the elemental metal. Prior to use the catalyst can be preconditioned with a hydrogen-containing gas at a temperature of between about 800° F. and about 1500° F.; although such treatment is not essential to satisfactory performance of the catalyst.

Alternatively, aqueous salt solutions of zirconium, nickel and cobalt can be mixed and precipitated with ammonia or alkali, filtered from solution, washed if necessary to remove alkali metals, and fired to sintering temperature or the temperature at which incipient surface fusion takes place to bind the surface particles. A variation of this method involves the coprecipitation of nickel and cobalt hydroxides on a solid mass of zirconia immersed in the precipitating solution.

Still another method of preparation comprises forming a dry mixture of zirconia and a nickel cobaltide, or mixed oxides of the active metals subjecting this solid mixture to a heat treatment to form a three component catalyst, wherein the metals are joined through oxygen bonding, and obtaining a calcined catalyst wherein the components are substantially uniformly dispersed. It is also to be understood that a solution or suspension of any one or a mixture of the above cobaltides or salts can then be added to the calcined dry mixture and the impregnation procedure outlined above repeated.

These and other methods and variations of the above catalyst preparations will become apparent to those skilled in the art from the teachings of this disclosure.

The feedstock which is suitably employed in the present reforming process may contain aliphatic and aromatic hydrocarbons from methane to high molecular weight compounds, including acyclic and alicyclic paraffinic and olefinic compounds, such as those containing up to about 40 carbon atoms and having molecular weights as high as 560. The hydrocarbon feed may be a single hydrocarbon such as those of the homologous series, $$C_nH_{2n+2} \text{ and } C_nH_{2n}$$

for example, ethane, propane, butane . . . dodecane, etc., and ethylene, propylene, butylene, hexene, octene, etc., or mixtures thereof.

The catalysts of this invention are particularly useful for the conversion with steam and/or carbon dioxide of feedstocks containing from about 5 to about 90, and usually not more than 80 mol percent olefins including refinery gas and coke oven gas. Also included within the scope of this invention is the steam and/or carbon dioxide reforming of normally liquid feedstocks such as those containing 50 mol percent or more of $C_5$ and higher hydrocarbons. Typical examples of such feedstocks are the various petroleum fractions such as naphtha distillates including light naphtha (e.g., boiling range of 100°–250° F.), heavy naphtha (e.g., boiling range of about 200°–400° F.), gas oil (e.g., boiling range of 400°–700° F.) and other liquid and viscous feeds such as mineral oils and crude petroleum oils including topped and residual oils. When employing the present catalysts, the high conversion of these feedstocks as well as $C_1$ to $C_4$ hydrocarbon feedstocks, is accomplished with minimum carbon accumulation, even at a low steam requirement and at a lower temperature than that required in previous processes.

By the catalyst preparations discussed above or by other methods known in the art, 30 weight percent or more of the cobalt and nickel metals can be deposited on the zirconia, although the more preferred amount of cobalt and nickel metals, based on the oxides, is from about 2 to about 15 weight percent. A total active metal concentration of between about 3 and about 12 weight percent is found to be extremely useful.

The catalyst introduced into the reforming zone can contain metal oxides deposited on the zironcia or the elemental metals on the zirconia, in the case where the catalyst is pretreated with a reducing gas such as, for example, hydrogen. Where the hydrogen treatment is omitted, oxides of the active moieties are nevertheless converted to the elemental state during the course of the reforming operation.

The specific steam to carbon ratio is influenced by the particular feedstock and increases as the olefinic content and/or molecular weight of the feed increases. From the standpoint of operating without permanent deposition of deactivating amounts of carbon on the catalysts of this invention, there is no upper limit to the steam to carbon ratio which can be employed, if desired. However, from economic and practical considerations, the steam to carbon ratio during operation does not usually exceed about 10:1 and by the present process can be reduced to less than 5, for example, between 1 and 4.5. Within these reduced levels of steam, the catalysts of this invention not only allow for the high conversion of the hydrocarbon feed, including otherwise difficultly reformed feeds such as olefinic and normally liquid fractions, without plugging of the catalyst bed, but they are highly active with high hydrocarbons flow rates leading to conversions as high as 100 percent and display an extended catalyst life.

Although the process of this invention can be effected over a relatively wide range of operating conditions including a temperature of between about 850° F. and about 2000° F., an advantage of the present ternary catalysts is their ability to promote high conversion of gaseous hydrocarbons to hydrogen rich product at relatively low temperatures, i.e., at temperatures preferably within the range of from about 900° F. to about 1500° F. Although with higher molecular weight hydrocarbons it is desirable to maintain a somewhat higher steam to carbon ratio.

Also included within the scope of this invention is the production of hydrogen-containing gas comprising up to about 60 mol percent of normally gaseous hydrocarbons, such as methane, ethane, etc., and having a high calorific value, such as between about 300 and about 1000 BTU's per standard cubic foot. The latter type of gaseous product, which is commonly referred to as Town's gas, is also produced within a lower temperature range of from about 600° F. to about 1100° F.; although below 850° F. it is preferred to use elevated pressure. Therefore, the operating temperatures of the reforming processes covered by this invention include 600° F. to 2000° F.

In operation, the prepared catalyst can be preconditioned with a hydrocarbon-containing gas at a temperature between about 800° F. and about the reaction temperature, although such treatment is not essential to satisfactory performance of the catalyst. It is important, however, that the catalyst be employed in a reducing atmosphere so that the formation of spinel such as the cobalt spinel $CoO.Co_2O_3$ or the nickel spinel $NiO.Co_2O_3$ is substantially avoided. The presence of spinel in the final catalyst is detrimental to the promotion function of the cobalt and when substantial amounts of spinel are present, the high steam-to-carbon ratio which is required with the nickel catalyst is not overcome.

Generally, it is preferred to preheat the feed prior to introduction into the catalyst bed. For example, heating of the hydrocarbon feedstock at a temperature of at least 600° F. facilitates attainment and maintenance of suitable temperatures in the conversion zone. Since catalytic steam reforming of hydrocarbons is an endothermic reaction, there are practical limits to the amount of heat which can be added to maintain the suitable elevated operating temperatures in the reforming zone. It is preferred, therefore, to preheat the feedstock to as high a temperature as is consistent with the reaction temperature desired while avoiding pyrolysis or other heat deterioration of the feed.

The present process is operable at atmospheric pressure and pressures above atmospheric without significant effect on the steam:carbon ratio. When steam reforming with the cobalt promoted nickel-zirconia catalyst of the present invention, the choice of a particular operating pressure is influenced primarily by the subsequent use of the gaseous hydrogen production. For many commercial uses of the hydrogen such as in ammonia synthesis the process is effected at superatmospheric pressure in order to minimize subsequent compression of the product. Generally, catalytic reforming zone is operated at a pressure between about 0 and about 1000 psig. and is usually at a pressure up to about 800 psig. When operating the present invention at elevated pressure, it is most preferred to employ a steam:carbon ratio of between about 2 and about 4.5 in order to maintain a high conversion of hydrocarbon feed and prolong the life of the catalyst.

Due to the high activity of the present catalyst, the space velocity in the catalytic reforming zone can be increased to levels as high as 3000 volumes of hydrocarbon expressed as the one equivalent per hour of catalyst; although, a space velocity of from about 500 to about 2000 is more usually employed.

The cobalt promoted nickel-zirconia catalysts of the present invention may be used in the form of lumps of irregular shapes, extrusions, rings, compressed pellets or powder including layers of these various physical forms. The operation may be as a fixed catalyst bed or a fluidized catalyst system. The steam required for the reforming may be premixed with the hydrocarbon feed and/or it may be admitted to the reaction zone as a separate feed. The feed may also contain various inert materials such as nitrogen. Oxygen may be admitted to the reaction zone in an amount from about 0.2 to about 1.0 or more moles per mole of organic compound in the feed and may be admitted as an oxygen-rich gas or as air. When the hydrogen product is utilized for the synthesis of ammonia, air is suitably employed. Also, hydrogen may form a portion of the feed and is beneficial in preventing deactivation of the metal oxides and the formation of a spinel by keeping them in reduced form. When hydrogen is employed in the process, it is introduced into the reaction zone in an amount between about 1% and about 20%, preferably between about 5 and about 10 mole percent based on hydrcarbon feed.

of cobalt oxide. This mixture is then calcined to produce the homogeneous catalyst of Example 15.

TABLE I

| Example | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Aq. Mix., gms. | | | | | | | | | | | | | | | |
| $Ni(NO_3)_2 \cdot 6H_2O$ | 4.29 | 2.10 | 41.3 | 34.2 | 33.9 | 41.3 | 34.2 | 9.1 | 9.8 | 35.12 | 4.4 | 9.1 | 34.2 | 41.3 | — |
| $Co(NO_3)_2 \cdot 6H_{.6H2}O$ | 4.24 | 2.08 | 44.5 | 10.0 | 22.4 | 44.5 | 10.0 | 44.0 | 38.7 | 4.33 | 34.8 | 44.0 | 10.0 | 44.5 | — |
| $ZrO_2$ | 215 | 215 | 213.1 | 207.1 | 201.2 | 213.1 | 207.1 | 215 | 215 | 215 | 215 | 215 | 207.1 | 213.1 | — |
| Mix. time, min. | 15 | 15 | 15 | 15 | 15 | 15 | 15 | 15 | 15 | 15 | 15 | 15 | 15 | 15 | — |
| Drying | | | | | | | | | | | | | | | |
| Min. | 180 | 180 | 1440 | 1440 | 1440 | 1440 | 1440 | 180 | 1200 | 1200 | 180 | 180 | 1440 | 1440 | — |
| ° F. | 240 | 240 | 240 | 240 | 240 | 240 | 240 | 240 | 240 | 240 | 240 | 240 | 240 | 240 | — |
| Calcination | | | | | | | | | | | | | | | |
| ° F. | 2000 | 2000 | 1000 | 1000 | 1000 | 2000 | 2000 | 2000 | 1000 | 1000 | 1000 | 2000 | 2000 | 2000 | 3000 |
| Hours | 16 | 16 | 2 | 2 | 2 | 16 | 16 | 16 | 2 | 2 | 2 | 16 | 16 | 16 | 5 |
| Analysis, wt. % | | | | | | | | | | | | | | | |
| NiO | 0.45 | 0.22 | 3.84 | 3.77 | 3.52 | 3.84 | 3.77 | 0.91 | 1.06 | 3.64 | 0.48 | 0.97 | 3.77 | 3.84 | 5.0 |
| CoO | 0.45 | 0.23 | 4.14 | 1.12 | 2.49 | 4.14 | 1.12 | 4.62 | 4.03 | 0.47 | 3.83 | 4.62 | 1.12 | 4.14 | 10.0 |
| Total Active Metals Wt. % | 0.90 | 0.45 | 7.98 | 4.89 | 6.01 | 7.98 | 4.89 | 5.53 | 5.09 | 4.11 | 4.21 | 5.59 | 4.89 | 7.98 | 15.00 |

After reaction, the reactor effluent is passed through cyclones if a fluid bed catalyst is employed or is separated directly as a gaseous procuct effluent and passed to further stages of purification, if desired.

The following examples are offered as a better understanding of the present invention and are not to be construed as unnecessarily limiting thereto.

EXAMPLES 1 THROUGH 15

THE NICKEL-COBALT-ZIRCONIA CATALYST

In each of the following examples the zirconia employed has the following chamical composition; 94.78 weight percent zirconium dioxide, 4.29 weight percent calcium oxide. 0.57 weight percent silica, 0.27 weight percent titanium dioxide and 0.09 weight percent ferric oxide. Other characteristics of the zirconia include a porosity of 33–36 percent, an apparent specific gravity of 5.3–5.6 grams per cc. and a surface area less than 1 square meter per gram. In each of the following examples 1 through 14 reported in TABLE I this zirconia in the form of 12/20 mesh particles is impregnated with a solution prepared by dissolving reagent grade nickel nitrate (99 percent purity) in 50 ml. of distilled water and dissolving reagent grade cobalt nitrate hexahydrate (99 percent purity) in 50 ml. of distilled water. The impregnated mass is mixed thoroughly, dried in an oven with occasional stirring, and then calcined. The specific conditions and analysis of the active metals in the zirconia supported catalysts are reported in TABLE I.

In Example 15, 215 grams of the zirconia is dry mixed with 12.6 grams of nickel oxide and 25.3 grams of cobalt oxide. This mixture is then calcined to produce the homogeneous catalyst of Example 15.

Each of the calcined catalysts reported above in TABLE I is introduced into a reactor consisting of a one inch diameter quartz tube fitted with an internal thermowell suitable for hydrocarbon reforming. In operation, 100 cc. (12/20 mesh) of catalyst is used to make up a catalyst bed 8 inches in length. The catalyst bed is located below 4 inches of Alundum chips which serve as a preheating zone. Prior to reforming, each of the 100 cc. charges of catalyst is hydrogen pretreated for 1 hour at 1400° F. during which time at least a portion of the cobalt and nickel oxides are converted to the elemental state. Water is metered through a calibrated flow meter, vaporized and mixed wit preheated hydrogen gas at the reactor inlet. When the steam flow is established, the hydrocarbon feed is introduced and hydrogen feed may be discontinued. During the ensuing reforming operations which are carried out under atmospheric pressure, the catalyst temperature is measured at the top, middle and bottom of the catalyst bed.

Effluent gases are passed through a condenser and a receiver to collect unreacted water (The effluent gases are sampled and analyzed by gas chromatography and mass spectroscopy.) before measuring in a wet test meter, after which they are vented to the atmosphere. Pressure drop across the catalyst bed is measured throughout each of the runs to give an indication of whether or not carbon accumulation is sufficient to cause plugging (noted by a measurable rise in the reactor pressure drop across the catalyst bed).

In the following runs of Examples 16 through 110, catalysts of Examples 1 through 15 are subjected to reforming of an ethane-ethylene feedstock. The particular operating conditions employed and the results are tabulated in TABLE II.

TABLE II

| Example | 16 | 17 | 18 | 19 | 20 | 21 | 22 | 23 | 24 | 25 | 26 | 27 |
|---|---|---|---|---|---|---|---|---|---|---|---|---|
| Catalyst of Example | 2 | 2 | 2 | 2 | 1 | 1 | 1 | 1 | 3 | 3 | 3 | 3 |
| Feedstock | | | | | | | | | | | | |
| Wt. % ethane | 26.5 | 26.5 | 26.5 | 26.5 | 26.5 | 26.5 | 26.5 | 26.5 | 31.7 | 31.7 | 31.7 | 31.7 |
| Wt. % ethylene | 73.3 | 73.3 | 73.3 | 73.3 | 73.3 | 73.3 | 73.3 | 73.3 | 68.3 | 68.3 | 68.3 | 68.3 |
| Catalyst | | | | | | | | | | | | |
| Volume, cc. | 50 | 80 | 80 | 80 | 92 | 92 | 92 | 92 | 100 | 100 | 100 | 100 |
| Weight, gms. | 138 | 138 | 138 | 138 | 154 | 154 | 154 | 154 | 204.3 | 204.3 | 204.3 | 204.3 |
| Operating Conditions | | | | | | | | | | | | |
| Reactor Temp. ° F. | | | | | | | | | | | | |
| Top | 1340 | 1278 | 1220 | 1155 | 1335 | 1268 | 1200 | 1135 | 1317 | 1276 | 1322 | 1294 |
| Middle | 1375 | 1298 | 1225 | 1150 | 1375 | 1300 | 1225 | 1150 | 1435 | 1432 | 1430 | 1430 |
| Bottom | 1375 | 1300 | 1225 | 1145 | 1395 | 1318 | 1235 | 1155 | 1434 | 1440 | 1435 | 1440 |
| Flow Rate | | | | | | | | | | | | |
| Cc. HC./min. | 44 | 49 | 50 | 51 | 48 | 48 | 45 | 50 | 42 | 54 | 69 | 81 |
| Cc. $H_2O$/min. | .72 | .70 | .76 | .77 | .72 | .73 | .75 | .75 | .68 | .68 | .68 | .67 |
| Cc. $H_2$/min. | 44 | 15 | 13 | 18 | 5 | 20 | 34 | 29 | 68 | 76 | 94 | 101 |
| Space Vel., cc.$C_1$/hr./cc. cat. | 65 | 73 | 75 | 76 | 62 | 62 | 62 | 65 | 50 | 65 | 83 | 97 |

TABLE II-continued

| | | | | | | | | | | | | |
|---|---|---|---|---|---|---|---|---|---|---|---|---|
| Run time, min.* | 30 | 90 | 180 | 300 | 30 | 90 | 180 | 300 | 120 | 240 | 345 | 450 |
| Steam/C ratio | 11.1 | 9.6 | 10.9 | 10.2 | 10.2 | 10.3 | 10.5 | 10 | 10.8 | 8.4 | 6.5 | 5.5 |
| Reactor ΔP increase, inches H₂O/hr. | 0 | 0 | 0 | 0 | 0 | 0 | 0 | 0 | 0 | 0 | 0 | 0 |
| Product Gas, mol % | | | | | | | | | | | | |
| H₂ | 71.3 | 70.7 | 70.1 | 69.0 | 74.8 | 74.4 | 73.1 | 71.9 | 74.4 | 74.1 | 73.6 | 73.3 |
| CO | 3.9 | 2.9 | 2.5 | 3.4 | 4.4 | 3.6 | 2.8 | 2.3 | 6.7 | 7.8 | 9.9 | 11.1 |
| CO₂ | 19.9 | 20.4 | 20.4 | 19.5 | 20.7 | 21.1 | 21.3 | 21.2 | 18.9 | 18.1 | 16.5 | 15.6 |
| CH₄ | — | — | — | — | — | — | — | — | — | — | — | — |
| C₂s | 4.9 | 6.0 | 7.0 | 8.1 | 0.1 | 0.9 | 2.8 | 4.6 | — | — | — | — |
| Feed Conv. Mol % | 70.8 | 66.0 | 62.1 | 58.6 | 99.2 | 93.2 | 81.1 | 71.9 | 100 | 100 | 100 | 100 |
| Min. H₂O/C ratio | | <2 | | | | <2 | | | | | | |

| Example | 28 | 29 | 30 | 31 | 32 | 33 | 34 | 35 | 36 | 37 | 38 | 39 | 40 |
|---|---|---|---|---|---|---|---|---|---|---|---|---|---|
| Catalyst of Example | 3 | 3 | 3 | 3 | 3 | 4 | 4 | 4 | 4 | 4 | 4 | 4 | 4 |
| Feedstock | | | | | | | | | | | | | |
| Wt. % ethane | 31.7 | 31.7 | 31.7 | 31.7 | 31.7 | 31.7 | 31.7 | 31.7 | 31.7 | 31.7 | 31.7 | 31.7 | 31.7 |
| Wt. % ethylene | 68.3 | 68.3 | 68.3 | 68.3 | 68.3 | 68.3 | 68.3 | 68.3 | 68.3 | 68.3 | 68.3 | 68.3 | 68.3 |
| Catalyst | | | | | | | | | | | | | |
| Volume, cc. | 100 | 100 | 100 | 100 | 100 | 100 | 100 | 100 | 100 | 100 | 100 | 100 | 100 |
| Weight, gms. | 204.3 | 204.3 | 204.3 | 204.3 | 204.3 | 197.2 | 197.2 | 197.2 | 197.2 | 197.2 | 197.2 | 197.2 | 197.2 |
| Operating Conditions | | | | | | | | | | | | | |
| Reactor Temp. °F. | | | | | | | | | | | | | |
| Top | 1268 | 1292 | 1273 | 1275 | 1288 | 1322 | 1280 | 1277 | 1255 | 1253 | 1273 | 1277 | 1287 |
| Middle | 1430 | 1430 | 1433 | 1430 | 1435 | 1439 | 1437 | 1435 | 1427 | 1422 | 1423 | 1425 | 1425 |
| Bottom | 1440 | 1435 | 1440 | 1440 | 1440 | 1441 | 1442 | 1440 | 1441 | 1440 | 1434 | 1440 | 1440 |
| Flow Rate | | | | | | | | | | | | | |
| Cc. HC/min. | 98 | 96 | 96 | 92 | 83 | 42 | 62 | 79 | 93 | 111 | 111 | 111 | 100 |
| Cc. H₂O/min. | .66 | .54 | .44 | .34 | .23 | .70 | .72 | .67 | .68 | .67 | .57 | .43 | .32 |
| Cc. H₂/min. | 122 | 105 | 100 | 105 | 65 | 51 | 65 | 60 | 77 | 89 | 45 | 81 | 106 |
| Space Vel., cc. C₁hr/cc.cat. | 118 | 115 | 115 | 111 | 99 | 51 | 74 | 92 | 111 | 133 | 133 | 133 | 120 |
| Run Time, min. (total line out time) | 555 | 660 | 765 | 870 | 975 | 120 | 240 | 345 | 450 | 555 | 660 | 765 | 870 |
| Steam/C ratio | 4.5 | 3.8 | 3.0 | 2.5 | 1.9 | 11 | 7.9 | 5.9 | 4.9 | 4.0 | 3.4 | 2.6 | 2.1 |
| Reactor ΔP increase, inches H₂O/hr. | 0 | 0 | 0 | 0 | 2.1 | 0 | 0 | 0 | 0 | 0 | 0 | 0 | 2.4 |
| Product Gas, mol % | | | | | | | | | | | | | |
| H₂ | 72.8 | 72.4 | 71.9 | 71.0 | 70.0 | 74.7 | 74.1 | 73.7 | 73.2 | 72.8 | 72.6 | 71.5 | 70.6 |
| CO | 12.9 | 14.9 | 17.0 | 19.7 | 23.5 | 5.5 | 7.8 | 9.4 | 11.5 | 13.1 | 14.2 | 18.0 | 21.3 |
| CO₂ | 14.3 | 12.7 | 11.1 | 9.3 | 5.5 | 19.8 | 18.1 | 16.9 | 15.3 | 14.1 | 13.2 | 10.4 | 7.9 |
| CH₄ | — | — | — | — | 0.3 | — | — | — | — | — | — | 0.1 | 0.2 |
| C₂s | — | — | — | — | — | — | — | — | — | — | — | — | — |
| Feed Conv., Mol % | 100 | 100 | 100 | 100 | 100 | 100 | 100 | 100 | 100 | 100 | 100 | 100 | 100 |
| Min. Steam/C ratio | | | | | 2 | | | | | | | | 2.3 |

| Example | 41 | 42 | 43 | 44 | 45 | 46 | 47 | 48 | 49 | 50 | 51 |
|---|---|---|---|---|---|---|---|---|---|---|---|
| Catalyst of Example | 5 | 5 | 5 | 5 | 5 | 5 | 6 | 6 | 6 | 6 | 6 |
| Feedstock | | | | | | | | | | | |
| Wt. % ethane | 31.7 | 31.7 | 31.7 | 31.7 | 31.7 | 31.7 | 31.1 | 31.1 | 31.1 | 31.1 | 31.1 |
| Wt. % ethylene | 68.3 | 68.3 | 68.3 | 68.3 | 68.3 | 68.3 | 68.9 | 68.9 | 68.9 | 68.9 | 68.9 |
| Catalyst | | | | | | | | | | | |
| Volume, cc. | 100 | 100 | 100 | 100 | 100 | 100 | 96 | 96 | 96 | 96 | 96 |
| Weight, gms. | 201.2 | 201.2 | 201.2 | 201.2 | 201.2 | 201.2 | 175.2 | 175.2 | 175.2 | 175.2 | 175.2 |
| Operating Conditions | | | | | | | | | | | |
| Reactor Temp. °F. | | | | | | | | | | | |
| Top | 1319 | 1274 | 1319 | 1310 | 1316 | 1357 | 1209 | 1205 | 1214 | 1230 | 1239 |
| Middle | 1435 | 1435 | 1435 | 1435 | 1434 | 1438 | 1370 | 1350 | 1353 | 1352 | 1353 |
| Bottom | 1433 | 1435 | 1432 | 1435 | 1432 | 1427 | 1428 | 1428 | 1427 | 1435 | 1433 |
| Flow Rate | | | | | | | | | | | |
| Cc. HC/min. | 40 | 61 | 97 | 89 | 84 | 72 | 110 | 118 | 101 | 101 | 90 |
| Cc. H₂O/min. | .70 | .71 | .73 | .57 | .42 | .29 | .70 | .62 | .42 | .29 | .21 |
| Cc. H₂/min. | 50 | 75 | 42 | 73 | 87 | 52 | 87 | 86 | 90 | 90 | 110 |
| Space Velocity, cc.C₁/hr/cc. cat. | 48 | 74 | 116 | 107 | 100 | 86 | 137 | 147 | 126 | 125 | 111 |
| Run Time, min. (total line out time) | 120 | 240 | 345 | 450 | 555 | 675 | 120 | 240 | 345 | 450 | 520 |
| Steam/C Ratio | 11.7 | 7.6 | 5.0 | 4.3 | 3.3 | 2.7 | 4.3 | 3.5 | 2.8 | 1.9 | 1.6 |
| Reactor ΔP increase inches H₂O/hr. | 0 | 0 | 0 | 0 | 0 | 0 | 0 | 0 | 0 | 0 | 5.2 |
| Product Gas, mol % | | | | | | | | | | | |
| H₂ | 74.5 | 74.1 | 73.4 | 73.0 | 72.1 | 72.6 | 72.8 | 72.3 | 71.5 | 70.1 | 69.1 |
| CO | 6.3 | 7.9 | 10.5 | 12.6 | 15.9 | 17.5 | 13.0 | 15.1 | 18.3 | 22.7 | 25.3 |
| CO₂ | 19.2 | 18.0 | 16.1 | 14.4 | 12.0 | 9.8 | 14.2 | 12.6 | 10.2 | 6.7 | 4.5 |
| CH₄ | — | — | — | — | — | 0.1 | — | — | — | 0.5 | 1.1 |
| C₂'s | — | — | — | — | — | — | — | — | — | — | — |
| Feed Conv. Mol % | 100 | 100 | 100 | 100 | 100 | 100 | 100 | 100 | 100 | 100 | 100 |
| Minimum H₂O/C ratio | | | | | | 2.8 | | | | | 1.8 |

| Example | 52 | 53 | 54 | 55 | 56 | 57 | 58 | 59 | 60 | 61 |
|---|---|---|---|---|---|---|---|---|---|---|
| Catalyst of Example | 7 | 7 | 7 | 7 | 7 | 8 | 8 | 8 | 8 | 8 |
| Feedstock | | | | | | | | | | |
| Wt. % ethane | 31.1 | 31.1 | 31.1 | 31.1 | 31.1 | 31.1 | 31.1 | 31.1 | 31.1 | 31.1 |
| Wt. % ethylene | 68.9 | 68.9 | 68.9 | 68.9 | 68.9 | 68.9 | 68.9 | 68.9 | 68.9 | 68.9 |
| Catalyst | | | | | | | | | | |
| Volume, cc. | 93 | 93 | 93 | 93 | 93 | 100 | 100 | 100 | 100 | 100 |
| Weight, gms. | 163.2 | 163.2 | 163.2 | 163.2 | 163.2 | 198.5 | 198.5 | 198.5 | 198.5 | 198.5 |
| Operating Conditions | | | | | | | | | | |

TABLE II-continued

| Reactor Temp. °F. | | | | | | | | | | |
|---|---|---|---|---|---|---|---|---|---|---|
| Top | 1201 | 1201 | 1203 | 1213 | 1217 | 1158 | 1135 | 1145 | 1158 | 1182 |
| Middle | 1350 | 1310 | 1302 | 1300 | 1300 | 1366 | 1350 | 1351 | 1350 | 1350 |
| Bottom | 1428 | 1425 | 1425 | 1427 | 1419 | 1425 | 1425 | 1425 | 1425 | 1425 |
| Flow Rate | | | | | | | | | | |
| Cc. HC/min. | 104 | 99 | 95 | 97 | 82 | 106 | 109 | 106 | 99 | 95 |
| Cc. $H_2O$/min. | .71 | .56 | .44 | .35 | .23 | .69 | .57 | .47 | .39 | .24 |
| Cc. $H_2$/min. | 64 | 105 | 110 | 82 | 108 | 73 | 68 | 57 | 65 | 95 |
| Space Velocity, | | | | | | | | | | |
| cc.$C_1$/hr/cc. cat. | 134 | 128 | 123 | 125 | 105 | 129 | 131 | 124 | 119 | 114 |
| Run Time, min. | | | | | | | | | | |
| (total line out time) | 105 | 210 | 315 | 420 | 475 | 105 | 210 | 315 | 420 | 475 |
| Steam/C Ratio | 4.6 | 3.8 | 3.1 | 2.4 | 1.9 | 4.3 | 3.5 | 2.9 | 2.6 | 1.7 |
| Reactor ΔP increase | | | | | | | | | | |
| inches $H_2O$/hr | 0 | 0 | 0 | 0 | 4.6 | 0 | 0 | 0 | 0 | 6.0 |
| Product Gas, mol % | | | | | | | | | | |
| $H_2$ | 73.1 | 72.5 | 71.9 | 71.0 | 70.0 | 72.9 | 71.9 | 71.9 | 71.3 | 68.4 |
| CO | 12.1 | 14.4 | 17.1 | 19.9 | 23.5 | 13.0 | 15.4 | 16.7 | 18.4 | 25.4 |
| $CO_2$ | 14.8 | 13.1 | 11.0 | 8.9 | 6.0 | 14.1 | 12.7 | 11.4 | 10.1 | 4.8 |
| $CH_4$ | 0 | 0 | 0 | 0.2 | 0.4 | 0 | 0 | 0 | 0.2 | 1.4 |
| $C_2$s | 0 | 0 | 0 | 0 | 0 | 0 | 0 | 0 | 0 | 0 |
| Feed Conv., Mol % | 100 | 100 | 100 | 100 | 100 | 100 | 100 | 100 | 100 | 100 |
| Minimum $H_2O$/C Ratio | | | | | 2.2 | | | | | 2.1 |

| Example | 62 | 63 | 64 | 65 | 66 | 67 | 68 | 69 | 70 | 71 | 72 | 73 | 74 | 75 |
|---|---|---|---|---|---|---|---|---|---|---|---|---|---|---|
| Catalyst of Example | 9 | 9 | 9 | 9 | 9 | 9 | 9 | 9 | 9 | 10 | 10 | 10 | 10 | 10 |
| Feedstock | | | | | | | | | | | | | | |
| Wt. % ethane | 30.5 | 30.5 | 30.5 | 30.5 | 30.5 | 30.5 | 30.5 | 30.5 | 30.5 | 25.5 | 25.5 | 25.5 | 25.5 | 25.5 |
| Wt. % ethylene | 69.5 | 69.5 | 69.5 | 69.5 | 69.5 | 69.5 | 69.5 | 69.5 | 69.5 | 73.2 | 73.2 | 73.2 | 73.2 | 73.2 |
| Catalyst | | | | | | | | | | | | | | |
| Volume, cc. | 100 | 100 | 100 | 100 | 100 | 100 | 100 | 100 | 100 | 100 | 100 | 100 | 100 | 100 |
| Weight, gms. | 178 | 178 | 178 | 178 | 178 | 178 | 178 | 178 | 178 | 185.5 | 185.5 | 185.5 | 185.5 | 185.5 |
| Operating Conds. | | | | | | | | | | | | | | |
| Reactor T. °F. | | | | | | | | | | | | | | |
| Top | 1245 | 1175 | 1162 | 1197 | 1154 | 1158 | 1207 | 1191 | 1200 | 1355 | 1355 | 1353 | 1333 | 1307 |
| Middle | 1358 | 1361 | 1351 | 1378 | 1352 | 1350 | 1382 | 1362 | 1353 | 1427 | 1425 | 1425 | 1425 | 1425 |
| Bottom 1424 | 1422 | 1420 | 1425 | 1422 | 1423 | 1426 | 1425 | 1420 | 1400 | 1405 | 1403 | 1412 | 1420 | |
| Flow Rate | | | | | | | | | | | | | | |
| Cc. HC/min. | 36 | 56 | 73 | 86 | 103 | 114 | 102 | 102 | 91 | 42 | 68 | 88 | 110 | 125 |
| Cc. $H_2O$/min. | .87 | .94 | .93 | .95 | .96 | .80 | .54 | .42 | .25 | .76 | .77 | .81 | .84 | .77 |
| Cc. $H_2$/min. | 38 | 54 | 52 | 53 | 80 | 74 | 60 | 55 | 50 | 30 | 55 | 33 | 52 | 100 |
| Space Velocity, | | | | | | | | | | | | | | |
| cc.$C_1$/hr/cc.cat. | 43 | 68 | 88 | 103 | 124 | 128 | 122 | 122 | 109 | 50 | 81 | 105 | 133 | 150 |
| Run Time, min. | | | | | | | | | | | | | | |
| (total line out) | 105 | 210 | 315 | 420 | 525 | 630 | 735 | 840 | 945 | 105 | 210 | 315 | 420 | 460 |
| Steam/C Ratio | 16.2 | 11.1 | 8.5 | 7.4 | 6.2 | 4.9 | 3.6 | 2.7 | 1.8 | 12.2 | 7.6 | 6.2 | 4.8 | 4.1 |
| Reactor ΔP incr. | | | | | | | | | | | | | | |
| inches $H_2O$/hr. | 0 | 0 | 0 | 0 | 0 | 0 | 0 | 0 | 0 | 0 | 0 | 0 | 0 | 5.6 |
| Product Gas, mol% | | | | | | | | | | | | | | |
| $H_2$ | 74.9 | 74.6 | 74.0 | 74.0 | 73.5 | 73.2 | 72.4 | 71.6 | 69.5 | 75.1 | 74.2 | 74.0 | 73.4 | 72.9 |
| CO | 4.3 | 5.4 | 8.3 | 8.0 | 10.2 | 11.5 | 14.7 | 18.0 | 24.2 | 4.3 | 7.1 | 8.3 | 10.6 | 12.7 |
| $CO_2$ | 20.8 | 20.0 | 17.7 | 18.0 | 16.3 | 15.3 | 12.9 | 10.4 | 5.6 | 20.6 | 18.7 | 17.7 | 16.0 | 14.4 |
| $CH_4$ | — | — | — | — | — | — | — | — | 0.7 | — | — | — | — | — |
| $C_2$s | — | — | — | — | — | — | — | — | — | — | — | — | — | — |
| Feed Conv. mol% | 100 | 100 | 100 | 100 | 100 | 100 | 100 | 100 | 100 | 100 | 100 | 100 | 100 | 100 |
| Min. $H_2O$/C Ratio | | | | | | | | | <1.8 | | | | | 4.5 |

| Example | 76 | 77 | 78 | 79 | 80 | 81 | 82 | 83 | 84 |
|---|---|---|---|---|---|---|---|---|---|
| Catalyst of Example | 11 | 11 | 11 | 11 | 11 | 11 | 11 | 11 | 11 |
| Feedstock | | | | | | | | | |
| Wt. % ethane | 26.5 | 26.5 | 26.5 | 26.5 | 26.5 | 26.5 | 26.5 | 26.5 | 26.5 |
| Wt. % ethylene | 73.2 | 73.2 | 73.2 | 73.2 | 73.2 | 73.2 | 73.2 | 73.2 | 73.2 |
| Catalyst | | | | | | | | | |
| Volume, cc. | 100 | 100 | 100 | 100 | 100 | 100 | 100 | 100 | 100 |
| Weight, gms. | 180.9 | 180.9 | 180.9 | 180.9 | 180.9 | 180.9 | 180.9 | 180.9 | 180.9 |
| Operating Conditions | | | | | | | | | |
| Reactor Temp. °F. | | | | | | | | | |
| Top | 1387 | 1397 | 1380 | 1350 | 1332 | 1327 | 1305 | 1295 | 1315 |
| Middle | 1425 | 1426 | 1425 | 1425 | 1423 | 1425 | 1425 | 1423 | 1420 |
| Bottom | 1390 | 1400 | 1410 | 1411 | 1396 | 1407 | 1410 | 1410 | 1410 |
| Flow Rate | | | | | | | | | |
| Cc. HC/min. | 44 | 67 | 85 | 109 | 126 | 127 | 122 | 118 | 109 |
| Cc. $H_2O$/min. | .84 | .85 | .84 | .86 | .95 | .64 | .50 | .37 | .27 |
| Cc. $H_2$/min. | 32 | 65 | 96 | 104 | 62 | 72 | 99 | 111 | 91 |
| Space Velocity, | | | | | | | | | |
| cc. $C_1$/hr/cc. cat. | 53 | 81 | 102 | 130 | 151 | 152 | 147 | 141 | 131 |
| Run Time, min. | | | | | | | | | |
| (total line out time) | 105 | 210 | 315 | 420 | 525 | 630 | 735 | 840 | 885 |
| Steam/C Ratio 12.7 | 8.4 | 6.6 | 5.3 | 4.3 | 3.4 | 2.7 | 2.1 | 1.7 | |
| Reactor ΔP increase | | | | | | | | | |
| inches $H_2O$/hr. | 0 | 0 | 0 | 0 | 0 | 0 | 0 | 0 | 8.0 |
| Product Gas, mol % | | | | | | | | | |
| $H_2$ | 74.9 | 74.4 | 73.8 | 73.5 | 73.2 | 72.6 | 71.8 | 71.0 | 70.2 |
| CO | 4.5 | 6.6 | 9.1 | 10.3 | 11.8 | 14.3 | 17.3 | 20.6 | 23.3 |
| $CO_2$ | 20.6 | 19.0 | 17.1 | 16.2 | 15.0 | 13.1 | 10.9 | 8.4 | 6.3 |
| $CH_4$ | — | — | — | — | — | — | — | — | 0.2 |
| $C_2$s | — | — | — | — | — | — | — | — | — |
| Feed Conversion, mol% | 100 | 100 | 100 | 100 | 100 | 100 | 100 | 100 | 100 |
| Min. Steam/C Ratio | | | | | | | | | 2.0 |

| Example | 85 | 86 | 87 | 88 | 89 | 90 | 91 | 92 | 93 | 94 | 95 | 96 | 97 |
|---|---|---|---|---|---|---|---|---|---|---|---|---|---|

TABLE II-continued

| Catalyst of Example | 12 | 12 | 12 | 12 | 12 | 13 | 13 | 13 | 13 | 13 | 13 | 13 | 13 |
|---|---|---|---|---|---|---|---|---|---|---|---|---|---|
| Feedstock | | | | | | | | | | | | | |
| Wt. % ethane | 31.1 | 31.1 | 31.1 | 31.1 | 31.1 | 31.1 | 31.1 | 31.1 | 31.1 | 31.1 | 31.1 | 31.1 | 31.1 |
| Wt. % ethylene | 68.9 | 68.9 | 68.9 | 68.9 | 68.9 | 68.9 | 68.9 | 68.9 | 68.9 | 68.9 | 68.9 | 68.9 | 68.9 |
| Catalyst | | | | | | | | | | | | | |
| Volume, cc. | 100 | 100 | 100 | 100 | 100 | 100 | 100 | 100 | 100 | 100 | 100 | 100 | 100 |
| Weight, gms. | 198.5 | 198.5 | 198.5 | 198.5 | 198.5 | 172.7 | 172.7 | 172.7 | 172.7 | 172.7 | 172.7 | 172.7 | 172 |
| Operating Conditions | | | | | | | | | | | | | |
| Reactor Temp. °F. | | | | | | | | | | | | | |
| Top | 1040 | 970 | 900 | 825 | 760 | 1230 | 1175 | 1130 | 1070 | 1005 | 940 | 860 | 750 |
| Middle | 1150 | 1075 | 1000 | 925 | 850 | 1375 | 1300 | 1225 | 1150 | 1075 | 1000 | 925 | 850 |
| Bottom | 1190 | 1130 | 1055 | 970 | 890 | 1400 | 1350 | 1285 | 1213 | 1140 | 1040 | 965 | 830 |
| Flow Rate | | | | | | | | | | | | | |
| Cc. HC/min. | 29 | 26 | 26 | 27 | 29 | 39 | 39 | 39 | 36 | 30 | 24 | 22 | 22 |
| Cc. $H_2O$/min. | .66 | .71 | .70 | .66 | .69 | .70 | .69 | .68 | .67 | .68 | .70 | .68 | .77 |
| Cc. $H_2$/min. | 47 | 62 | 68 | 55 | 46 | 62 | 71 | 65 | 81 | 99 | 77 | 86 | 73 |
| Space Velocity, cc.$C_1$/hr/cc. cat. | 35 | 31 | 31 | 32 | 35 | 47 | 47 | 46 | 43 | 36 | 29 | 26 | 26 |
| Run Time, min. (total line out time) | 20 | 40 | 60 | 80 | 100 | 40 | 75 | 110 | 155 | 190 | 230 | 265 | 300 |
| Steam/C Ratio | 15.0 | 18.2 | 17.9 | 16.5 | 15.8 | 11.9 | 11.4 | 11.8 | 12.5 | 14.8 | 17.6 | 20.9 | 23.5 |
| Reactor ΔP increase inches $H_2O$/hr. | 0 | 0 | 0 | 0 | 0 | 0 | 0 | 0 | 0 | 0 | 0 | 0 | 2.0 |
| Product Gas, mol % | | | | | | | | | | | | | |
| $H_2$ | 75.4 | 75.4 | 75.1 | 74.4 | 71.9 | 74.5 | 74.8 | 74.9 | 75.0 | 75.3 | 75.0 | 72.3 | 67.3 |
| CO | 2.6 | 2.2 | 1.6 | 1.1 | 0.9 | 6.0 | 4.9 | 4.8 | 3.9 | 2.8 | 1.5 | 0.9 | 0.7 |
| $CO_2$ | 22.0 | 22.4 | 22.8 | 23.0 | 22.5 | 19.5 | 20.3 | 20.3 | 21.1 | 21.9 | 22.8 | 23.1 | 22.0 |
| $CH_4$ | — | — | 0.5 | 1.1 | 1.5 | — | — | — | — | — | 0.7 | 3.2 | 4.4 |
| $C_2$s | — | — | — | 0.4 | 3.2 | — | — | — | — | — | — | 0.5 | 5.6 |
| Feed Conversion mol% | 100 | 100 | 100 | 97.0 | 79.5 | 100 | 100 | 100 | 100 | 100 | 100 | 96.4 | 70.3 |
| Min. $H_2O$/C Ratio | | | | | | | | | | | | | Plugged |

| Example | 98 | 99 | 100 | 101 | 102 | 103 | 104 | 105 | 106 | 107 | 108 |
|---|---|---|---|---|---|---|---|---|---|---|---|
| Catalyst of Example | 14 | 14 | 14 | 14 | 14 | 14 | 14 | 14 | 15 | 15 | 15 |
| Feedstock | | | | | | | | | | | |
| Wt. % ethane | 31.1 | 31.1 | 31.1 | 31.1 | 31.1 | 31.1 | 31.1 | 31.1 | 27.8 | 27.8 | 27.8 |
| Wt. % ethylene | 68.9 | 68.9 | 68.9 | 68.9 | 68.9 | 68.9 | 68.9 | 68.9 | 72.2 | 72.2 | 72.2 |
| Catalyst | | | | | | | | | | | |
| Volume, cc. | 100 | 100 | 100 | 100 | 100 | 100 | 100 | 100 | 100 | 100 | 100 |
| Weight, gms. | 165.5 | 165.5 | 165.5 | 165.5 | 165.5 | 165.5 | 165.5 | 165.5 | 199.2 | 199.2 | 199.2 |
| Operating Conditions | | | | | | | | | | | |
| Reactor Temp. °F. | | | | | | | | | | | |
| Top | 1301 | 1260 | 1185 | 1120 | 1045 | 975 | 840 | 820 | 1249 | 1198 | 1193 |
| Middle | 1375 | 1300 | 1205 | 1150 | 1015 | 1000 | 925 | 830 | 1398 | 1380 | 1375 |
| Bottom | 1376 | 1338 | 1264 | 1184 | 1100 | 1010 | 919 | 842 | 1425 | 1423 | 1425 |
| Flow Rate | | | | | | | | | | | |
| Cc.HC/min. | 39 | 42 | 40 | 41 | 38 | 33 | 23 | 24 | 102 | 120 | 123 |
| Cc.$H_2O$/min. | .70 | .69 | .72 | .71 | .71 | .69 | .68 | .64 | .88 | .88 | .73 |
| Cc.$H_2$/min. | 41 | 42 | 63 | 62 | 56 | 64 | 69 | 74 | 30 | 47 | 28 |
| Space Velocity, cc. $C_1$/hr/cc. cat. | 47 | 50 | 48 | 49 | 46 | 40 | 28 | 24 | 123 | 144 | 147 |
| Run Time, min. (total line out time) | 40 | 75 | 105 | 135 | 165 | 205 | 240 | 270 | 105 | 210 | 295 |
| Steam/C Ratio | 11.9 | 11.0 | 11.8 | 11.5 | 12.3 | 13.9 | 19.0 | 17.6 | 5.6 | 4.9 | 3.9 |
| Reactor ΔP increase inches $H_2O$/hr. | 0 | 0 | 0 | 0 | 0 | 0 | 0 | 16 | 0 | 0 | 3 |
| Product Gas, mol% | | | | | | | | | | | |
| $H_2$ | 74.7 | 74.9 | 75.0 | 75.1 | 75.2 | 74.6 | 71.3 | 64.6 | 72.3 | 72.8 | 72.6 |
| CO | 5.4 | 5.1 | 4.1 | 3.5 | 3.2 | 2.0 | 1.0 | 0 | 11.1 | 10.7 | 12.4 |
| $CO_2$ | 19.9 | 20.0 | 20.9 | 21.4 | 21.6 | 22.2 | 22.5 | 23.2 | 15.3 | 15.8 | 14.7 |
| $CH_4$ | 0 | 0 | 0 | 0 | 0 | 1.0 | 2.3 | 3.3 | 0 | 0 | 0 |
| $C_2$s | 0 | 0 | 0 | 0 | 0 | 0.2 | 2.9 | 8.9 | 1.3 | 0.8 | 0.3 |
| Feed Conversion mol% | 100 | 100 | 100 | 100 | 100 | 98.4 | 81.6 | 59.9 | 91.0 | 94.3 | 97.8 |
| Min. Steam/C Ratio | | | | | | | | Plugged | | | 4.0 |

*total line out time

From TABLE II and FIG. I (more fully discussed hereinafter) it can be seen that the zirconia supported nickel-cobalt catalysts having compositions within the ranges of the present invention provide a carbon-free conversion of the feed over a wide range of steam-to-carbon ratios as indicated by the absence of pressure drop increase across the catalyst bed. In addition to operability at low levels of steam, the results of TABLE II show that catalysts having a minimum of about 1 weight percent total active metals possess high activity resulting in single pass conversions greater than 95 mol percent at high catalyst space velocity and hydrocarbon flow rates. It is found, however, that where the concentration of the total active metals in the catalyst compositions fall below 0.9 weight percent, hydrocarbon conversion is inordinately decreased by about 40 percent. The catalysts having a total active metal concentration of one weight percent or more are characterized by their superior strength and structural stability under reforming temperature conditions.

After the relatively long periods of testing, the catalysts of this invention show no loss of active metal components due to volatilization as is noted with the zinc and alkali promoted nickel catalysts. This characteristic, together with the lack of reactivity between the active components and the support and the cobalt promoter, provide the high catalytic activity over long periods of operation which is so essential in reforming catalysts.

In order to avoid deleterious side reactions which cause the formation of undesirable by-products and to improve the economics of operation, it is recommended that, under atmospheric conditions, hydrocarbon reforming be carried out most preferably at an average temperature below 1500° F. and above 1100° F. Although the present catalysts show high acitivity, i.e., 100% conversion, of hydrocarbon at temperatures as low as 975° F., reforming temperatures below 900° F. are usually avoided as the possibility of carbon formation is increased. This effect is noted by comparing Examples 85 to 89, 90 to 97 and 98 to 105 in TABLE II.

EXAMPLES 111 THROUGH 123

THE UNPROMOTED NICKEL-ZIRCONIA CATALYST

The following runs carried out at atmospheric pressure are presented for comparison purposes. The unpromoted catalysts are prepared by impregnating zirconia of the type employed in Examples 1 through 15 with nickel oxide by mixing the zirconia with a 50 ml. aqueous solution of nickel nitrate and drying the mixture for about 2 hours and then calcining the dried mixture for about 2 hours at 1000° F. The calcined catalyst is hydrogen pretreated as above in Examples 1 through 15. The resulting catalysts are then subjected to reforming conditions using an ethane-ethylene feedstock and the particular operating conditions reported in the following TABLE III wherein the results are also recorded.

890° F. (Example 89); still in spite of this low temperature (890° F.) hydrocarbon conversion was substantial.

EXAMPLES 124 THROUGH 142

NICKEL-ZIRCONIA WITH PROMOTERS OTHER THAN COBALT

The following catalysts, provided for the purposes of comparison, test the efficacy of promoters other than cobalt in lowering the steam-to-carbon ratio and maintaining high activity under reforming conditions. The promoters considered are the oxides of copper (Group IB); zinc (Group IIB); uranium (Group VI); iron (Group VIII) and sodim metal (Group IA).

In each case, 12/20 mesh zirconia particles of the type used in Examples 1 through 15 are impregnated with an aqueous solution of nickel nitrate and metal nitrate promoter by stirring the zirconia with the warm nitrate solution in an evaporating dish every 0.5 hour. The impregnated zirconia samples are dried at about 240° F. overnight in a Precision Scientific Oven and are then calcined for 2 hours at 1000° F. in a Hoskins Furnace to provide the catalyst samples for testing under reforming conditions. Each of the promoted catalysts (Examples 124 through 127) is then introduced into a quartz reactor and reforming of an ethane-ethylene feedstock is carried out in accordance with the method described in Examples 16 through 108. The particular

TABLE III

| Example | 111 | 112 | 113 | 114 | 115 | 116 | 117 | 118 | 119 | 120 | 121 | 122 | 123 |
|---|---|---|---|---|---|---|---|---|---|---|---|---|---|
| HC Feedstock | | | | | | | | | | | | | |
| Wt. % ethane | 31.7 | 31.7 | 31.7 | 31.7 | 32.4 | 31.7 | 31.7 | 31.7 | 31.7 | 32.2 | 32.2 | 31.1 | 31.1 |
| Wt. % ethylene | 68.3 | 68.3 | 68.3 | 68.3 | 66.3 | 68.9 | 68.9 | 68.9 | 68.9 | 67.8 | 67.8 | 68.9 | 68.9 |
| Catalyst | | | | | | | | | | | | | |
| Wt. % NiO on $ZrO_2$ | 4.64 | 4.64 | 4.64 | 4.64 | 4.64 | 6.18 | 6.18 | 6.18 | 6.18 | 4.64 | 4.64 | 6.18 | 6.18 |
| Volume, cc. | 100 | 100 | 100 | 100 | 100 | 96 | 96 | 96 | 96 | 100 | 100 | 100 | 100 |
| Weight, gms. | 203 | 203 | 203 | 203 | 202.2 | 166.5 | 166.5 | 166.5 | 166.6 | 173.8 | 173.8 | 171.5 | 171.5 |
| Operating Cond. | | | | | | | | | | | | | |
| Reactor Temp. ° F. | | | | | | | | | | | | | |
| Top | 1352 | 1324 | 1333 | 1317 | 1050 | 1295 | 1293 | 1241 | 1205 | 1200 | 1173 | 1150 | 1068 |
| Middle | 1445 | 1436 | 1435 | 1435 | 1100 | 1395 | 1376 | 1385 | 1376 | 1383 | 1382 | 1300 | 1225 |
| Bottom | 1443 | 1437 | 1432 | 1440 | 1097 | 1425 | 1425 | 1424 | 1425 | 1422 | 1428 | 1328 | 1255 |
| Flow Rate | | | | | | | | | | | | | |
| Cc.HC/min. | 41 | 54 | 56 | 72 | 28 | 38 | 58 | 67 | 85 | 22 | 51 | 32 | 28 |
| Cc.$H_2O$/min. | .72 | .73 | .70 | .68 | .65 | .75 | .78 | .81 | .79 | .55 | .55 | .59 | .67 |
| Cc.$H_2$/min. | 53 | 72 | 91 | 69 | 75 | 57 | 78 | 98 | 66 | 0 | 0 | 63 | 56 |
| Space Velocity, | | | | | | | | | | | | | |
| cc.$C_1$/hr/cc. cat. | 49 | 64 | 67 | 86 | 34 | 48 | 73 | 85 | 106 | 38 | 61 | 38 | 34 |
| Run Time, min. | | | | | | | | | | | | | |
| (total line out) | 120 | 240 | 345 | 565 | 325 | 120 | 240 | 345 | 475 | 120 | 225 | 30 | 78 |
| Steam/C Ratio | 11.7 | 9.1 | 8.4 | 6.4 | 15.5 | 13.2 | 9.0 | 8.0 | 6.2 | 11.6 | 7.3 | 12.3 | 16.0 |
| Reactor ΔP increase | | | | | | | | | | | | | |
| inches $H_2O$/hr. | 0 | 0 | 0 | 1.0 | 5.0 | 0 | 0 | 0 | 1.7 | 0 | 5.6 | 0 | .0 |
| Product Gas Mol% | | | | | | | | | | | | | |
| $H_2$ | 74.5 | 74.3 | 74.1 | 73.6 | 75.3 | 74.8 | 74.3 | 73.9 | 73.7 | 76.6 | 75.9 | 74.7 | 75.1 |
| CO | 6.1 | 7.0 | 8.0 | 9.8 | 2.5 | 4.8 | 7.0 | 8.5 | 9.6 | 5.1 | 8.3 | 5.4 | 3.6 |
| $CO_2$ | 19.4 | 18.7 | 17.9 | 16.6 | 22.1 | 20.4 | 18.7 | 17.6 | 16.7 | 18.3 | 15.5 | 19.9 | 21.3 |
| $CH_4$ & $C_2$s | 0 | 0 | 0 | 0 | 0 | 0 | 0 | 0 | 0 | 0 | 0 | 0 | 0 |
| Feed Conv. Mol % | 100 | 100 | 100 | 100 | 99.9 | 100 | 100 | 100 | 100 | 100 | 100 | 100 | 100 |
| Min. $H_2O$/C Ratio | | | | 6.5 | Plugged at 1100° F | | | | 6.3 | | 7.7 | | plugged |

The runs of TABLE III with unpromoted nickel-zirconia catalyst show that the minimum steam-to-carbon ratio is increased more than three fold over that of the cobalt promoted catalyst at comparable active metal concentrations. Also, reforming at temperatures as high as 1225° F. (Example 123) resulted in plugging of the catalyst bed. With cobalt promoted catalyst, plugging was avoided even at the temperature as low as catalyst preparations are reported in TABLE IV and the particular operating conditions and results of reforming are tabulated in following TABLE V.

Not shown in the table is the preparation of the nickel oxide-zirconia catalyst promoted with elemental sodium. This catalyst was prepared by dry milling the components to provide a catalyst mixture of 4.5 weight percent Na; 4.5 weight percent NiO on the zirconia used in Examples 1-15. This material was then calcined at 1000° F.

TABLE IV

| Example | Promoter (gms.) | Ni(NO$_3$)$_2$·6H$_2$O (gms) | Distilled H$_2$O (ml) | ZrO$_2$ (gms) | Sample Comp. | Sample Wt. (gms) |
|---|---|---|---|---|---|---|
| 124 | UO$_2$(NO$_3$)$_2$·6H$_2$O 24 g. | 38 | 45 | 192.6 | 4.5 UO$_2$ Wt. % <br> 4.5 NiO Wt. % | 208.3 |
| 125 | Cu(NO$_3$)$_2$·3H$_2$O 30 g. | 38 | 30 | 196.1 | 4.5 CuO Wt. % <br> 4.5 NiO Wt. % | 203.8 |
| 126 | Zn(NO$_3$)$_2$·6H$_2$O 37.9 g. | 40.3 | 30 | 208.5 | 4.5 ZnO Wt. % <br> 4.5 NiO Wt. % | 201.9 |
| 127 | Fe(NO$_3$)$_2$·6H$_2$O 56.7 g. | 39.2 | 40 | 203.4 | 4.5 FeO Wt. % <br> 4.5 NiO Wt. % | 187.9 |

TABLE V

| Example | 128 | 129 | 130 | 131 | 132 | 133 | 134 | 135 | 136 | 137 | 138 | 139 |
|---|---|---|---|---|---|---|---|---|---|---|---|---|
| HC Feedstock | | | | | | | | | | | | |
| Wt. % ethane | 31.7 | 31.7 | 31.7 | 31.7 | 31.7 | 31.7 | 31.7 | 31.7 | 31.7 | 31.7 | 31.7 | 31.7 |
| Wt. % ethylene | 68.3 | 68.3 | 68.3 | 68.3 | 68.3 | 68.3 | 68.3 | 68.3 | 68.3 | 68.3 | 68.3 | 68.3 |
| Catalyst | | | | | | | | | | | | |
| Promoter | | | | UO$_2$ | CuO | | | | | | | ZnO* |
| Wt. % Prom. | | | | 4.5 | 3.7 | | | | | | | 4.5 |
| Wt. % NiO | | | | 4.5 | 3.8 | | | | | | | 4.5 |
| Volume, cc. | 100 | 100 | 100 | 100 | 100 | 100 | 100 | 100 | 100 | 100 | 100 | 100 |
| Weight, gms. | 208.3 | 208.3 | 208.3 | 208.3 | 203.8 | 201.9 | 201.9 | 201.9 | 201.9 | 201.9 | 201.9 | 201 |
| Operating Cond. | | | | | | | | | | | | |
| Reactor Temp. °F. | | | | | | | | | | | | |
| Top | 1371 | 1361 | 1370 | 1351 | 1323 | 1341 | 1318 | 1326 | 1306 | 1296 | 1308 | 1287 |
| Middle | 1440 | 1440 | 1440 | 1435 | 1435 | 1433 | 1428 | 1425 | 1428 | 1425 | 1424 | 1425 |
| Bottom | 1440 | 1440 | 1443 | 1440 | 1438 | 1435 | 1435 | 1428 | 1435 | 1435 | 1431 | 1438 |
| Flow Rate | | | | | | | | | | | | |
| Cc. HC/min. | 40 | 58 | 65 | 74 | 32 | 30 | 38 | 50 | 62 | 72 | 79 | 77 |
| Cc. H$_2$O/min. | .73 | .73 | .72 | .73 | .74 | .75 | .78 | .70 | .73 | .73 | .75 | .56 |
| Cc. H$_2$/min. | 34 | 64 | 39 | 54 | 58 | 25 | 41 | 53 | 60 | 65 | 80 | 85 |
| Space Velocity, | | | | | | | | | | | | |
| cc. C$_1$/hr/cc. cat. | 48 | 70 | 77 | 89 | 38 | 36 | 46 | 61 | 75 | 86 | 95 | 92 |
| Steam/C Ratio | 12.2 | 8.3 | 7.5 | 6.6 | 15.6 | 16.9 | 13.6 | 9.2 | 7.8 | 6.8 | 6.3 | 4.9 |
| ΔP increase | | | | | | | | | | | | |
| inches H$_2$O/hr. | 0 | 0 | 0 | 1.1 | 3.4 | 0 | 0 | 0 | 0 | 0 | 0 | 0.4 |
| Product Gas, mol % | | | | | | | | | | | | |
| H$_2$ | 74.6 | 74.2 | 74.1 | 73.8 | 74.9 | 74.9 | 74.8 | 74.3 | 74.2 | 74.0 | 73.7 | 73.1 |
| CO | 5.6 | 7.4 | 7.8 | 9.1 | 4.5 | 4.6 | 4.7 | 6.8 | 7.5 | 8.4 | 9.6 | 11.8 |
| CO$_2$ | 19.8 | 18.4 | 18.1 | 17.1 | 20.6 | 20.5 | 20.5 | 18.9 | 18.3 | 17.6 | 16.7 | 15.1 |
| CH$_4$ & C$_2$s | 0 | 0 | 0 | 0 | 0 | 0 | 0 | 0 | 0 | 0 | 0 | 0 |
| Feed Conv. mol % | 100 | 100 | 100 | 100 | 100 | 100 | 100 | 100 | 100 | 100 | 100 | 100 |
| Min. Steam/C Ratio | | | | 6.7 | 15.8 | | | | | | | 5.0 |
| Run Time, min. | 120 | 240 | 345 | 450 | 120 | 120 | 240 | 345 | 450 | 555 | 660 | 770* |

| Example | 140 | 141 | 142 |
|---|---|---|---|
| HC Feedstock | | | |
| Wt. % ethane | 31.7 | 31.7 | 31.7 |
| Wt. % ethylene | 68.3 | 68.3 | 68.3 |
| Catalyst | | | |
| Promoter | | | FeO |
| Wt. % Promoter | | | 4.2 |
| Wt. % NiO | | | 4.1 |
| Volume, cc. | 100 | 100 | 100 |
| Weight, gms. | 192.3 | 192.3 | 192.3 |
| Operating Conditions | | | |
| Reactor temp. °F. | | | |
| Top | 1377 | 1371 | 1370 |
| Middle | 1437 | 1437 | 1435 |
| Bottom | 1429 | 1432 | 1430 |
| Flow Rate | | | |
| Cc. HC/min. | 42 | 56 | 56 |
| Cc. H$_2$O/min. | .71 | .70 | .70 |
| Cc. H$_2$/min. | 56 | 74 | 154 |
| Space Velocity, | | | |
| cc. Cl/hr/cc. catalyst | 50 | 67 | 67 |
| Steam/C Ratio | 11.4 | 8.4 | 8.4 |
| Reactor ΔP Increase, | | | |
| inches H$_2$O/hr. | 0 | 0 | 0 |
| Product Gas, Mol % | | | |
| H$_2$ | 74.1 | 73.7 | 73.2 |
| CO | 5.4 | 5.6 | 7.5 |
| CO$_2$ | 19.7 | 19.5 | 18.1 |
| CH$_4$ | 0 | 0 | 0 |
| C$_2$s | 0.8 | 1.2 | 1.2 |
| Feed Conversion, Mol % | 93.9 | 91.3 | 91.4 |
| Run Time, min. | 120 | 180 | 230 |

Sodium (4.5 wt. %) and NiO (4.5 wt. %) on Zirconia shows poor operability and high steam requirement due to volitilization of the sodium.
*Initial composition. ZnO volatilizes under reaction conditions The reforming examples of TABLE V and FIG. III, representative of metal oxide promoters from five groups of the Periodic Table which are commonly used to promote nickel catalysts, show that in each case, except in the case of iron oxide, carbon deposits on the catalyst result and the minimum steam-to-carbon ratio is high. In the case of iron oxide promotion, the minimum steam-to-carbon ratio is not measured for the reason that the hydrocarbon conversion falls below acceptable levels after less than four hours of operation. (In the case of sodium promotion the test was terminated due to high volatilization of sodium.) Comparison of the results in TABLE V with those in TABLE II establishes the unique promotion properties of cobalt in a catalyst having the composition set forth in the present disclosure.

FIG. III of the drawings illustrates the comparison of cobalt with copper, nickel, and zinc promoters where the catalyst comprises 4.5 weight percent promoter and 4.5 weight percent nickel oxide on zirconia. It is noted from the curve that the steam requirements (minimum steam-to-carbon ratio) of cobalt promoted catalyst is at least doubled when other promoters are substituted.

EXAMPLES 143 THROUGH 159

COBALT-ZIRCONIA CATALYST

The catalyst preparation outlined in Examples 1 through 14 was employed for impregnating the zirconia with aqueous cobalt nitrate until 4.87 weight percent and 4.64 weight percent cobalt oxide was separately deposited on the samples of zirconia support, except that in this case no solution of nickel nitrate was added to the zirconia.

The cobalt impregnated zirconia samples were dried and calcined at about 1850° F. for 66 hours to provide the catalyst of Examples 143 through 148 which contained 4.87 weight percent cobalt oxide. A similar catalyst was made for Examples 149–159, containing 4.64% CoO on zirconia, by drying and calcining at 1000° F. for 2 hours. The catalysts of these examples were then subjected to reforming under the conditions reported and summarized in following TABLE VI.

TABLE VI

| Example | 143 | 144 | 145 | 146 | 147 | 148 | 149 | 150 | 151 | 152 |
|---|---|---|---|---|---|---|---|---|---|---|
| HC Feedstock |  |  |  |  |  |  |  |  |  |  |
| Wt. % ethane | 31.7 | 31.7 | 31.7 | 31.7 | 31.7 | 31.7 | 33.7 | 33.7 | 33.7 | 33.7 |
| Wt. % ethylene | 68.3 | 68.3 | 68.3 | 68.3 | 68.3 | 66.3 | 66.3 | 66.3 | 66.3 | 66.3 |
| Catalyst,Wt. % |  |  |  |  |  |  |  |  |  |  |
| CoO on $ZrO_2$ | 4.87 | 4.87 | 4.87 | 4.87 | 4.87 | 4.87 | 4.64 | 4.64 | 4.64 | 4.64 |
| Volume, cc. | 100 | 100 | 100 | 100 | 100 | 100 | 100 | 100 | 100 | 100 |
| Weight, gms. | 193.8 | 193.8 | 193.8 | 193.8 | 193.8 | 193.8 | 202.8 | 202.8 | 202.8 | 202.8 |
| Operating conds. |  |  |  |  |  |  |  |  |  |  |
| Reactor T ° F. |  |  |  |  |  |  |  |  |  |  |
| Top | 1364 | 1295 | 1226 | 1156 | 1077 | 1006 | 1238 | 1187 | 1187 | 1262 |
| Middle | 1450 | 1375 | 1300 | 1225 | 1150 | 1075 | 1360 | 1373 | 1375 | 1355 |
| Bottom | 1449 | 1374 | 1300 | 1224 | 1146 | 1071 | 1436 | 1445 | 1445 | 1447 |
| Flow Rate |  |  |  |  |  |  |  |  |  |  |
| Cc.HC/min. | 26 | 26 | 26 | 26 | 26 | 26 | 97 | 86 | 81 | 55 |
| Cc.$H_2O$/min. | .64 | .64 | .65 | .65 | .66 | .66 | .74 | .62 | .62 | .69 |
| Cc.$H_2$/min. | 52 | 52 | 54 | 51 | 52 | 49 | 0 | 115 | 102 | 115 |
| Space Velocity, |  |  |  |  |  |  |  |  |  |  |
| Cc.$C_1$/hr/cc.cat. | 31 | 31 | 31 | 31 | 30 | 31 | 116 | 103 | 97 | 67 |
| Run Time, min. |  |  |  |  |  |  |  |  |  |  |
| (Total line out) | 45 | 90 | 135 | 175 | 215 | 260 | 70 | 100 | 130 | 250 |
| Steam/C Ratio | 16.3 | 16.4 | 16.7 | 16.7 | 17.6 | 16.7 | 5.1 | 4.8 | 5.1 | 8.4 |
| Reactor ΔP incr. |  |  |  |  |  |  |  |  |  |  |
| inches $H_2O$/hr. | 0 | 0 | 0 | 0 | 0 | 0 | 0 | 0 | 0 | 0 |
| Product Gas Mol % |  |  |  |  |  |  |  |  |  |  |
| $H_2$ | 74.9 | 74.9 | 74.4 | 73.8 | 72.6 | 71.8 | 70.3 | 71.5 | 73.5 | 73.8 |
| CO | 3.6 | 4.3 | 3.5 | 2.6 | 1.8 | 1.1 | 9.4 | 17.9 | 10.3 | 9.0 |
| $CO_2$ | 16.5 | 20.8 | 21.2 | 21.6 | 21.8 | 22.0 | 15.5 | 10.3 | 16.2 | 17.2 |
| $CH_4$ | — | — | — | — | 0.1 | 0.1 | 0.3 | 0.3 | — | — |
| $C_2$s | — | — | 0.9 | 2.0 | 3.7 | 5.0 | 4.5 | — | — | — |
| Feed Conversn. |  |  |  |  |  |  |  |  |  |  |
| (Vol. %) | 100 | 100 | 93.2 | 85.8 | 75.4 | 69.9 | 73.7 | 100 | 100 | 100 |

| Example | 153 | 154 | 155 | 156 | 157 | 158 | 159 |
|---|---|---|---|---|---|---|---|
| HC Feedstock |  |  |  |  |  |  |  |
| Wt. % ethane | 33.7 | 33.7 | 33.7 | 33.7 | 33.7 | 33.7 | 33.7 |
| Wt. % ethylene | 66.3 | 66.3 | 66.3 | 66.3 | 66.3 | 66.3 | 66.3 |
| Catalyst, Wt. % |  |  |  |  |  |  |  |
| Co on $ZrO_2$ | 4.64 | 4.64 | 4.64 | 4.64 | 4.64 | 4.64 | 4.64 |
| Volume, cc. | 100 | 100 | 100 | 100 | 100 | 100 | 100 |
| Weight, gms. | 202.8 | 202.8 | 202.8 | 202.8 | 202.8 | 202.8 | 202.8 |
| Operating Conds. |  |  |  |  |  |  |  |
| Reactor T. ° F. |  |  |  |  |  |  |  |
| Top | 1262 | 1260 | 1237 | 1221 | 1227 | 1203 | 1197 |
| Middle | 1334 | 1355 | 1361 | 1361 | 1375 | 1368 | 1365 |
| Bottom | 1447 | 1450 | 1406 | 1411 | 1430 | 1425 | 1429 |
| Flow Rate |  |  |  |  |  |  |  |
| Cc. HC/min. | 35 | 33 | 87 | 101 | 104 | 102 | 106 |
| Cc. $H_2O$/min. | .67 | .67 | .69 | .67 | .52 | .48 | .36 |
| Cc. $H_2$/min. | 96 | 140 | 100 | 108 | 60 | 87 | 103 |
| Space Velocity |  |  |  |  |  |  |  |
| Cc. $C_1$/hr/cc.cat. | 43 | 40 | 105 | 121 | 126 | 122 | 128 |
| Run Time, min. |  |  |  |  |  |  |  |
| (total line out) | 370 | 400 | 515 | 630 | 750 | 795 | 895 |
| Steam/C Ratio | 12.6 | 13.5 | 5.3 | 4.4 | 3.3 | 3.1 | 2.2 |
| Reactor ΔP incr., |  |  |  |  |  |  |  |
| inches $H_2O$/hr. | 0 | 0 | 0 | 0 | 0 | 0 | 0 |
| Product Gas Mol % |  |  |  |  |  |  |  |
| $H_2$ | 74.2 | 74.4 | 73.1 | 73.0 | 71.5 | 71.4 | 70.6 |
| CO | 7.4 | 5.5 | 11.9 | 12.4 | 16.1 | 17.7 | 21.5 |
| $CO_2$ | 18.4 | 19.1 | 15.0 | 14.6 | 11.8 | 10.5 | 7.7 |
| $CH_4$ | — | — | — | — | 0.1 | 0.1 | 0.1 |
| $C_2$s | — | — | — | — | 0.5 | 0.3 | 0.1 |
| Feed Conversion |  |  |  |  |  |  |  |
| (Vol. %) | 100 | 100 | 100 | 100 | 96.4 | 97.8 | 99.3 |

EXAMPLES 160 THROUGH 165
COBALT-NICKEL ON SUPPORTS OTHER THAN ZIRCONIA

The above data establish that the combination of cobalt and nickel is a remarkable superior mixture for reforming catalyst and that this combination of metals display a synergistic effect in the zirconia supported catalyst. High reforming activity and low steam requirement can both be attained by the proper choice of cobalt-nickel zirconia. The following examples in TABLE VII are presented to show the effect of substituting other support materials for zirconia in the present catalyst compositions. The supports under consideration are those commonly employed in formulating reforming catalyst mixtures and include silica-alumina, carborumdum, titania, alumina-magnesia and silicous cements.

All of the catalyst compositions reported in TABLE VII were prepared by impregnating the support with aqueous nitrate solutions until the desired weight percent of nickel and cobalt is deposited. The impregnated supports were then dried and calcined at about 1000° F. for about 2 hours and were then subjected to steam reforming of ethane at 1000° F. with a steam-to-carbon ratio of about 10 and a space velocity of about 50 cc $C_1$/hr/cc. of catalyst. Low catalyst activity is apparent for all compositions containing supports other than zirconia.

TABLE VII
EFFECT OF SUPPORT MATERIAL ON CATALYTIC ACTIVITY OF NICKEL-COBALT CATALYSTS

| Ex. | SUPPORT | Wt. % NiO + CoO | Cobalt/ Nickel | Steam Reforming Rate Constant At 1000° F. |
|---|---|---|---|---|
| 160 | Zirconia | 5.3% | 1.0 | 100–1,000 |
| 161 | Cement | 15.0% | 0.3 | 7 |
| 162 | Magnesia-Alumina | 5.2% | 1.0 | 3.0 |
| 163 | Kaolin | 5.1% | 0.9 | 0.1 |
| 164 | Titania | 7.7% | 1.0 | 0.03 |
| 165 | CHT Silicon Carbide | 5.0% | 1.0 | 0.001 |

EXAMPLES 166–168

A 98.3 gram sample of 15 weight percent nickel oxide on alumina is prepared by impregnating alpha alumina particles of 12/20 mesh size with an aqueous solution of nickel nitrate in 30 ml. of water. The impregnated alumina is dried at 240° F. and then calcined for 2 hours at 1000° F. This catalyst is subjected to reforming of a standard ethane-ethylene feedstock (about 30/70 weight percent) at an average temperature of 1300° F. for 4 hours. The catalyst is then removed and decarbonized by calcining at 1000° F. for 2 hours to provide a 96.1 gram sample of 12/20 mesh particle nickel-alumina mixture. This mixture is then impregnated with 18.55 grams of cobalt nitrate, Co(NO$_3$)2.H$_2$O in 30 m. of warm distilled water and the impregnated mixture dried at 240° F. overnight and then calcined for 2 hours at 1000° F. to provide a ninety gram sample of nickel-alumina catalyst containing 4.5 weight percent cobalt oxide. This nickel-cobalt-alumina catalyst is subjected to reforming of a 68.3% ethylene-31.7% ethane feedstock and the operating conditions and results are reported in TABLE VIII which follows. The data show the high steam requirement (9.3) when alumina is used as support material.

TABLE VIII
COBALT-NICKEL-ALUMINA MINIMUM STEAM/CARBON TEST

| EXAMPLE | 166 | 167 | 168 |
|---|---|---|---|
| Runtime, Mins.(total line out) | 120 | 240 | 360 |
| Catalyst Volume | 100 | 100 | 100 |
| Weight, gm. | 90.0 | 90.0 | 90.0 |
| Operating Conds. Reactor Temp. ° F. | | | |
| Top | 1345 | 1335 | 1349 |
| Mid. | 1434 | 1430 | 1430 |
| Btm. | 1436 | 1435 | 1431 |
| Flow Rate | | | |
| cc HC/Min. | 47 | 56 | 56 |
| cc H$_2$O/Min. | .79 | .79 | .78 |
| cc H$_2$ Added/Min. Calculated | 63 | 81 | 69 |
| Space Velocity cc C./Hr./cc Cat. | 56 | 67 | 67 |
| Steam/Carbon Ratio | 11.3 | 9.4 | 9.2 |
| Reactor ΔP Increase in. H$_2$O/Hr. | 0 | 0 | 3 |
| Product Gas, Mole % | | | |
| H$_2$ | 74.6 | 74.5 | 74.6 |
| CO | 5.7 | 6.4 | 5.8 |
| CO$_2$ | 19.7 | 19.1 | 19.6 |
| CH$_4$ | — | — | — |
| C$_2$S | — | — | — |
| Feed Conversion, Mole % | 100.0 | 100.0 | 100.0 |
| Minimum H$_2$O/C | — | — | 9.3 |

Examples of the specification are plotted in FIGS. I and II of the drawings. The symbol ● signifies catalyst which has been pretreated by aging 16 hours in air at 2000° F.; whereas the symbol 0 signifies catalyst which has not been subjected to pretreatment. The bracketed percents represent the total active metals (Ni and-/or Co) on the support and the points are identified by the examples they represent which precede the percents of total active metals.

FIG. I provides comparisons between the nickel-cobalt-zirconia catalyst and the cobalt-zirconia catalyst of Example 159; the present catalyst and the nickel-zirconia catalysts of Examples 111, 116 and 120; and the present catalyst and a composite steam reforming catalyst which are used commercially (i.e., nickel on alumina). This composite is indicated by the symbol ◐. The curve of the plotted data shows that a plateau of low minimum steam-to-carbon is obtained which is disproportional to the amounts of cobalt present. Specifically, the concentration less than 10% cobalt oxide (based on the combined nickel and cobalt oxides) is sufficient to destroy the low minimum steam-to-carbon ratio; although some improvement over the commercial reforming catalyst is evidenced. Most preferred concentrations of nickel oxide (based on the combined nickel and cobalt oxides) are shown to fall within the range of 7 to 75 weight percent.

FIG. II of the drawings illustrates the effect of active metal concentration on catalytic activity. Activity is defined by the temperature at which feed break-through (i.e., unconverted hydrocarbon) begins to occur; except in the cases of Examples 122–123 wherein the system is inoperable below 1225° F. due to carbon formation which causes plugging of the apparatus. As shown in FIG. II, the activity of the catalyst is very low with 0.45 weight percent active metal concentration so that even reforming temperatures as high as about 1650° F. do not prevent feed break-through when the active metal concentration is less than 0.5 weight percent. Comparison of the present nickel-cobalt-zirconia catalyst with cobalt on zirconia shows that the activity falls off disproportionately when less than 15% nickel (with respect to cobalt) is present and the catalyst is substantially degraded when less than 0.5% nickel (with respect to cobalt) is present in the catalyst composition. Since nickel is used for commercial catalysts because of its high activity, the remarkably superior activity of the nickel diluted with cobalt catalysts of Examples 85–105 (as compared with Examples 122–123), is completely unexpected.

The combined teaching of FIGS. I and II illustrates the importance of the nickel to cobalt weight ratio and the synergistic effect of this active metal combination. In FIG. I, the curve shows that low minimum steam-to-carbon ratio are realized during reforming with catalyst containing up to 95 weight percent nickel with respect to 5 weight percent cobalt and less than 4.5 minimum steam-to-carbon ratio is obtainable with nickel present up to 90 weight percent with respect to 10 weight percent cobalt. On the other hand, FIG. II shows that high catalyst activity is achieved with catalyst containing as little as about 4 weight percent nickel with respect to 96 weight percent cobalt and, with as little as 15 weight percent nickel, the highest activity is attained and is retained through nickel concentrations up through 85 weight percent nickel.

Having thus described our invention, we claim:

1. The process for preparing a reforming catalyst composition which comprises:
   treating a zirconia support with a cobalt component and a nickel component as the active components, said active components consisting essentially of a solution or suspension of the metal oxide, the elemental metal, the metal salt, a nickel cobaltide or mixtures thereof;
   drying the treated mass of temperatures between about 175° F. and about 550° F. to form an intermixture; and
   heating said intermixture to a temperature between about 600° F. and 3000° F. to form a ternary catalyst containing between about 0.2 and about 30 weight percent cobalt and between about 0.1 and about 30 weight percent nickel, based on the corresponding oxides, and having a weight ratio of nickel to cobalt between about 1:15 and about 9:1, and at least 1.0 weight percent concentration of the combined cobalt and nickel components in the catalyst composition.

2. The process of claim 1 wherein the nickel and cobalt components in a weight ratio of between 1:10 and 6:1 are intermixed with zirconia.

3. The process of claim 2 wherein an aqueous mixture with the metal nitrate of at least one of said components is intermixed with said zirconia and the intermixture is dried at a temperature below 600° F. prior to calcining at 600° F. to 3000° F.

4. The process of claim 2 wherein an aqueous mixture with the metal oxide of at least one of said components is intermixed with said zirconia and the intermixture is dried at a temperature below 600° F. prior to calcining at 600° F. to 3000° F.

5. The process of claim 2 wherein an aqueous solution or suspension of the cobalt and nickel components is intermixed with zirconia.

6. The process of claim 5 wherein a separate solution or suspension is employed for each active component.

7. The process of claim 6 wherein the zirconia is intermixed alternately with the solutions or suspensions of the Ni and Co components.

8. The process of claim 5 wherein the zirconia is dried after each intermixture with other component containing solution or suspension.

9. The process of claim 8 wherein the mixture is calcined after each drying step.

10. The process of claim 8 wherein the mixture is calcined after the final drying step.

11. The process of claim 3 wherein said calcining step is carried out in the presence of oxygen or air to convert the nitrate to oxide.

12. The process of claim 4 wherein said calcining step is carried out in the presence of a reducing gas to convert the metal oxide to elemental metal.

13. The process of claim 8 wherein the calcined intermixture is impregnated with an oxide solution of at least one of the active metal components and is then recalcined at 600° F. to 2000° F.

14. The process of claim 2 wherein aqueous salt solutions of nickel, cobalt and zirconium selected from the group of nitrates, carbonates, sulfates and mixtures thereof are mixed and the corresponding mixture is sintered at 600° F. to 3000° F.

15. The process of claim 2 wherein aqueous salt solutions of nickel and cobalt, selected from the group of nitrates, carbonates, sulfates and mixtures thereof are converted to the corresponding oxides by treatment with alkali and the oxide mixture is treated with hydrogen to convert the oxides to the elemental metal at a temperature between 600° F. and 3000° F.

16. The process of claim 2 wherein the elemental metal of at least one of said components is mixed with said zirconia.

17. The process of claim 3 wherein the elemental metal is employed in aqueous suspension.

18. A catalyst composition consisting essentially of: 1–15 weight percent, as the oxide, cobalt, 0.5–15 weight percent, as the oxide, nickel and 70–98.5 weight percent support consisting essentially of zirconia and having a nickel to cobalt ratio between about 1:15 and 9:1.

19. The catalyst of claim 18 wherein the nickel and cobalt metal components comprise between 3 and about 15 weight percent of the total composition.

20. The catalyst of claim 18 wherein the weight percent cobalt is 2–8, the weight percent Ni is 1–5 and the weight percent zirconia is 85–97 and the weight ratio of Ni to Co is 1:10.

21. The catalyst of claim 18 wherein the nickel and cobalt are the active components of the catalyst and wherein at least one component is present as the elemental metal.

22. The catalyst of claim 18 wherein the nickel and cobalt are the active components of the catalyst and wherein at least one component is present as the metal oxide.

23. The catalyst of claim 18 wherein the nickel and cobalt components are at least partially present as nickel cobaltide.

24. The catalyst of claim 18 wherein the weight ratio of nickel to cobalt is between 1:10 and 6:1.

* * * * *